US012774172B2

(12) United States Patent
Grahn

(10) Patent No.: US 12,774,172 B2
(45) Date of Patent: Oct. 27, 2026

(54) METHOD AND SYSTEM FOR DETERMINING BELT SLIPPAGE

(71) Applicant: Ocado Innovation Limited, Hatfield (GB)

(72) Inventor: Anton Grahn, Stockholm (SE)

(73) Assignee: Ocado Innovation Limited, Hatfield (GB)

( * ) Notice: Subject to any disclaimer, the term of this patent is extended or adjusted under 35 U.S.C. 154(b) by 0 days.

(21) Appl. No.: 19/242,984

(22) Filed: Jun. 19, 2025

(65) Prior Publication Data

US 2025/0313416 A1 Oct. 9, 2025

Related U.S. Application Data

(63) Continuation of application No. PCT/EP2023/086709, filed on Dec. 19, 2023.

(30) Foreign Application Priority Data

Dec. 19, 2022 (GB) ...................................... 2219190

(51) Int. Cl.
*B65G 43/04* (2006.01)
*B65G 1/04* (2006.01)

(52) U.S. Cl.
CPC ........... *B65G 43/04* (2013.01); *B65G 1/0464* (2013.01); *B65G 1/0478* (2013.01)

(58) Field of Classification Search
CPC ..... B65G 1/0464; B65G 1/0478; B65G 43/04
See application file for complete search history.

(56) References Cited

U.S. PATENT DOCUMENTS

| | | | | |
|---|---|---|---|---|
| 6,654,662 | B1 | 11/2003 | Hognaland | |
| 2019/0128777 | A1 | 5/2019 | Adachi | |
| 2021/0101753 | A1* | 4/2021 | Kataria | B65G 23/44 |
| 2021/0237971 | A1* | 8/2021 | Zhang | B65G 1/0428 |
| 2023/0090378 | A1* | 3/2023 | Whelan | B60B 17/0055 414/267 |
| 2023/0125328 | A1* | 4/2023 | Lindbo | B65G 1/0464 414/281 |
| 2023/0263107 | A1* | 8/2023 | Stadie | B65G 1/137 47/17 |
| 2024/0294331 | A1 | 9/2024 | Whelan et al. | |
| 2024/0375868 | A1 | 11/2024 | Nilsson et al. | |
| 2025/0089618 | A1* | 3/2025 | Modak | B65G 39/16 |

FOREIGN PATENT DOCUMENTS

| | | | |
|---|---|---|---|
| CN | 104773465 | B | 2/2017 |
| CN | 116062402 | A | 5/2023 |
| JP | 06345240 | A | 12/1994 |

(Continued)

OTHER PUBLICATIONS

International Search Report and Written Opinion mailed Apr. 12, 2024 in corresponding International Patent Application No. PCT/EP2023/086709, 11 pages.

(Continued)

*Primary Examiner* — Saul Rodriguez
*Assistant Examiner* — Ashley K Romano
(74) *Attorney, Agent, or Firm* — Gregory Matt McCloskey

(57) ABSTRACT

A method and system for determining drive belt slippage is disclosed. The method and system uses two motors to determine drive belt slippage.

12 Claims, 21 Drawing Sheets

(56) References Cited

FOREIGN PATENT DOCUMENTS

| | | | |
|---|---|---|---|
| JP | 893868 | A | 4/1996 |
| JP | 11326146 | A | 11/1999 |
| JP | 2000289836 | A | 10/2000 |
| JP | 2000318826 | A | 11/2000 |
| WO | 2014128849 | A1 | 8/2014 |
| WO | 2015019055 | A1 | 2/2015 |
| WO | 2015185628 | A1 | 12/2015 |
| WO | WO-2014128849 | * | 2/2016 |
| WO | 2019206438 | A1 | 10/2019 |
| WO | 2021021242 | A1 | 2/2021 |
| WO | 2021175922 | A1 | 9/2021 |
| WO | 2021175956 | A1 | 9/2021 |
| WO | 2023083913 | A1 | 5/2023 |
| WO | 2024133309 | A1 | 6/2024 |

OTHER PUBLICATIONS

Office Action issued on Aug. 11, 2025 by the Korean Patent Office in corresponding KR Application No. 10-2025-7023401 (6 pages) corresponding to Applicant's U.S. Appl. No. 19/242,984.

Office Action issued on Dec. 2, 2025 by the Japanese Patent Office in corresponding Japanese Application No. 2025-536106 (6 pages) corresponding to Applicant's U.S. Appl. No. 19/242,984.

Office Action issued on Apr. 30, 2026 by the Australian Patent Office in corresponding Australian Application No. 2023410333 (4 pages) corresponding to Applicant's U.S. Appl. No. 19/242,984.

* cited by examiner

METHOD AND SYSTEM FOR DETERMINING BELT SLIPPAGE

CROSS-REFERENCE TO RELATED APPLICATIONS

This Application is a continuation of PCT International Patent Application No. PCT/EP2023/086709, filed on Dec. 19, 2023, which claims priority to UK Patent Application No. GB2219190.2, filed on Dec. 19, 2022, the entire contents of each of which are hereby incorporated by reference.

TECHNICAL FIELD

The present invention relates to a method and system for determining slippage in drive belts, such as those used in a load-handling device.

BACKGROUND

Some commercial and industrial activities require systems that enable the storage and retrieval of a large number of different products. WO2015/185628A describes a storage and fulfilment system in which stacks of storage containers are arranged within a grid storage structure. The containers are accessed from above by load-handling devices operative on rails or tracks located on the top of the grid storage structure. The load-handling devices are further described in WO2015/019055A1.

Within the storage and fulfilment system, it is important that the load-handling devices perform optimally. In particular, drive belts used in a load-handling device should operate under an optimal tension. It is against this background that the present invention has been devised.

SUMMARY

In a first aspect, there is system for determining slippage of a drive belt, the system comprising: a drive belt; first and second motors configured to drive the drive belt; and a controller configured to: receive first and second current transients from the first and second motors respectively during a simultaneous activation of the first and second motors to drive the drive belt; and determine slippage of the drive belt if first and second current values of the first and second current transients, respectively, differ by at least a threshold at substantially the same time. This means the system can use existing system components alone to determine slippage of the drive belt; no external hardware is required to determine drive belt slippage.

The threshold may be defined by a minimum percentage difference between the first and second current values, and/or a minimum ampere difference between the first and second current values. This ensures noise in the current transients is not determined as belt slippage.

There is a load-handling device for lifting and moving storage containers stacked in a grid framework structure comprising: a first set of parallel rails or tracks and a second set of parallel rails or tracks extending substantially perpendicularly to the first set of rails or tracks in a substantially horizontal plane to form a grid pattern comprising a plurality of grid spaces, wherein the grid is supported by a set of uprights to form a plurality of vertical storage locations beneath the grid for containers to be stacked between and be guided by the uprights in a vertical direction through the plurality of grid spaces, the load-handling device comprising: a body or skeleton mounted on a first set of wheels being arranged to engage with the first set of parallel tracks and a second set of wheels being arranged to engage with the second set of parallel tracks; and a drive assembly comprising a first system according to the above aspects, wherein the drive belt and first and second motors of the first system are configured to drive the first or second sets of wheels to move the load-handling device along the first or second set of parallel rails respectively, and wherein the controller of the first system is configured to receive the first and second current transients from the first and second motors of the first system respectively during a driving of the first or second sets of wheels; and/or a direction-change assembly comprising a second system according to the above aspects, wherein the drive belt and first and second motors of the second system are configured to raise or lower the first set of wheels, and or lower or raise the second set of wheels with respect to the body or skeleton to engage and disengage the wheels with the parallel tracks, and wherein the controller of the second system is configured to receive the first and second current transients from the first and second motors of the second system respectively during a raising or lowering of the first set of wheels, and or a lowering or raising of the second set of wheels; and/or a container-lifting assembly comprising a third system according to the above aspects, wherein the drive belt and first and second motors of the third system are configured to raise or lower a gripping device in the vertical direction, and wherein the controller of the third system is configured to receive the first and second current transients from the first and second motors of the third system respectively during a raising or lowering of the gripping device. This means slippage in the drive belts of the load-handling device can be detected.

The direction-change assembly may be arranged to raise or lower the first set of wheels and synchronously respectively lower or raise the second set of wheels with respect to the body. This means slippage during a direction-change can be detected.

The direction-change assembly may comprise at least one direction-change mechanism for either of the first or second sets of wheels, or each of the first and second sets of wheels set of wheels. The direction-change assembly may comprise two direction-change mechanisms for each of the first and second set of wheels. The direction-change mechanisms may be driven by the drive belt of the second system. This means slippage can be correlated to a specific operation of the direction change mechanism.

The first and second motors are mounted may be mounted in opposite or adjacent locations of the load-handling device. The opposite or adjacent locations may comprise corners of the load-handling device. The opposite or adjacent locations or corners may be on the body or skeleton. The drive belt may substantially circumnavigate the load-handling device skeleton or body. This means the motors may be positioned to apportion a torque load between them.

The system may further comprise an automatic tensioning device, and the controller may be further configured to control the automatic tensioning device to increase the tension of the drive belt upon determining slippage of the drive belt has occurred, and/or reduce the tension of the drive belt upon determining slippage of the drive belt has not occurred. This means the system can prevent drive belt slippage and/or optimize drive belt efficiency during subsequent operation.

In a second aspect, there is a method for determining slippage of a drive belt in a system, wherein the system comprises the system of any preceding claim, the method comprising using the controller to: receive first and second current transients from the first and second motors respectively during a simultaneous activation of the first and second motors to drive the drive belt; and determine slippage of the drive belt has occurred if first and second current values of the first and second current transients, respectively, differ by at least a threshold at substantially the same time.

In a third aspect, there is a computer program comprising instructions which, when the program is executed by a computer, cause the computer to carry out the method of the second aspect.

In a fourth aspect, there is a data processing system comprising a processor configured to carry out the method of the second aspect.

DESCRIPTION OF THE DRAWINGS

The present invention is described with reference to one or more exemplary embodiments as depicted in the accompanying drawings, wherein.

DETAILED DESCRIPTION

Online retail businesses selling multiple product lines, such as online grocers and supermarkets, require systems that can store tens or hundreds of thousands of different product lines. The use of single-product stacks in such cases can be impractical since a vast floor area would be required to accommodate all of the stacks required. Furthermore, it can be desirable to store small quantities of some items, such as perishables or infrequently ordered goods, making single-product stacks an inefficient solution.

International patent application WO 98/049075A (Autostore), the contents of which are incorporated herein by reference, describes a system in which multi-product stacks of containers are arranged within a frame structure.

PCT Publication No. WO2015/185628A (Ocado) describes a further known storage and fulfilment system in which stacks of containers are arranged within a grid framework structure. The containers are accessed by one or more load-handling devices, otherwise known as "bots", operative on tracks located on the top of the grid framework structure. A system of this type is illustrated schematically in FIGS. 1-3 of the accompanying drawings.

Figure 1:
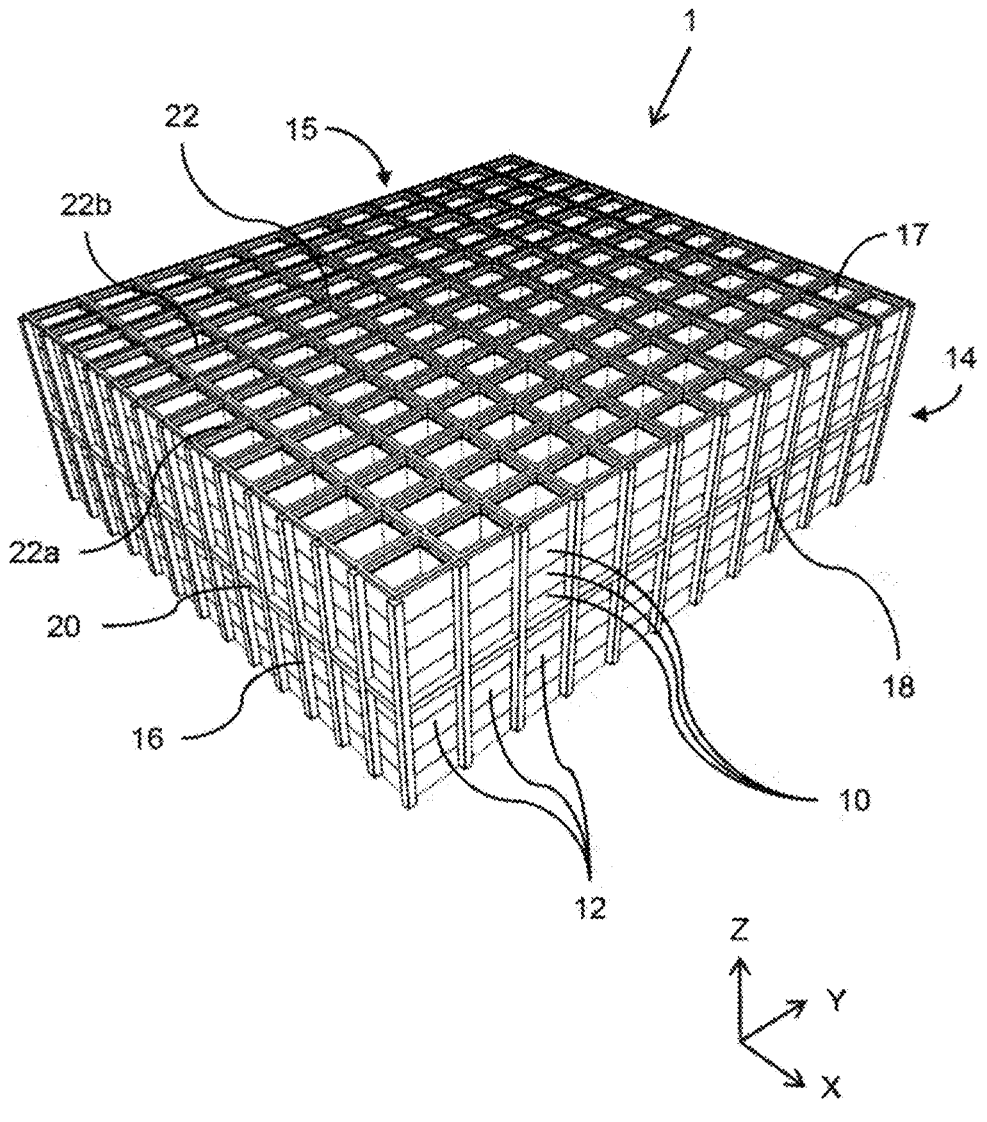
FIG. 1 (PRIOR ART)
FIG. 1 shows a storage structure and containers.
Figure 2:
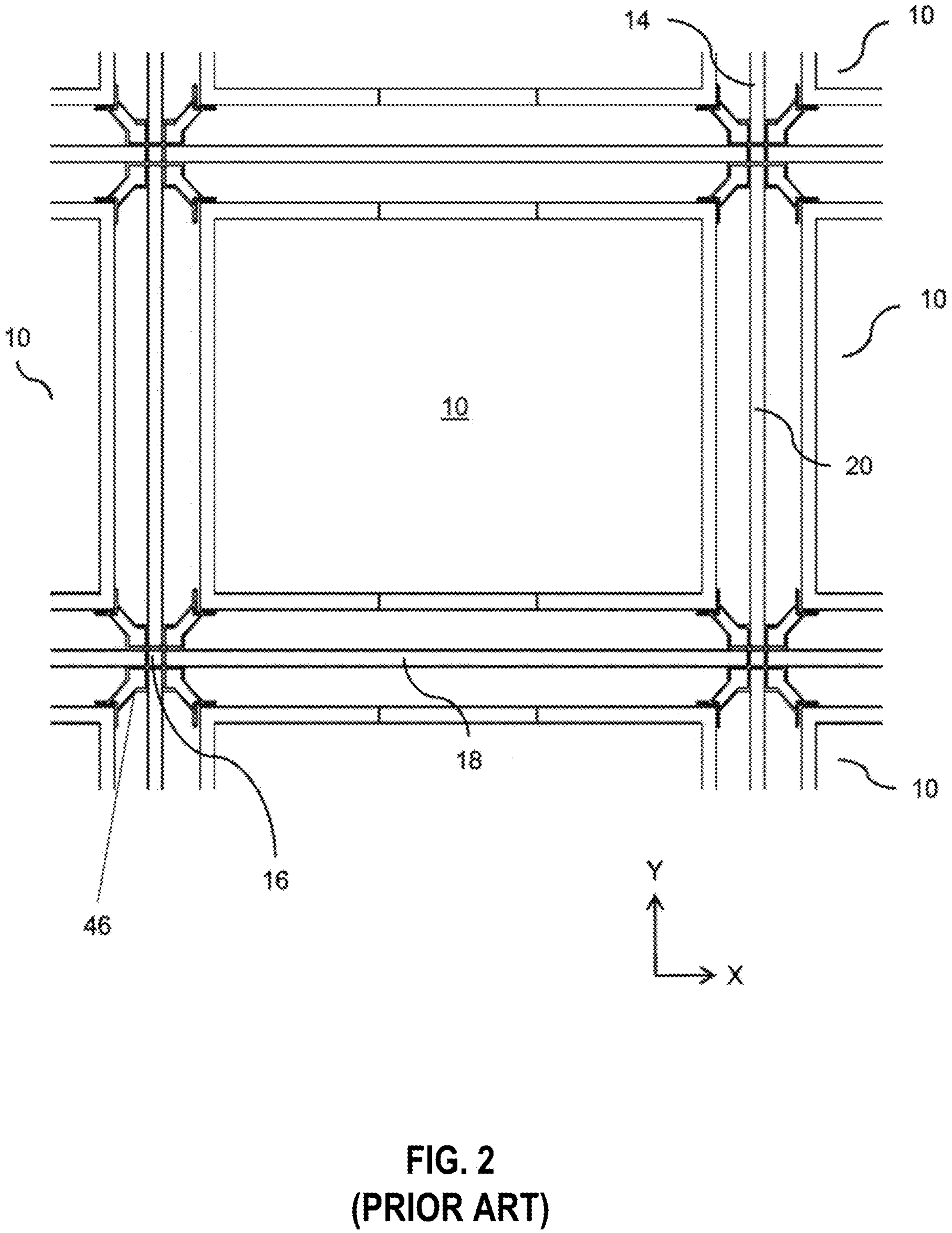
FIG. 2 (PRIOR ART)
FIG. 2 shows rails or tracks on top of the storage structure illustrated in FIG. 1.

As shown in FIGS. 1 and 2, stackable containers 10, also known as "bins" or "totes", are stacked on top of one another to form stacks 12. The stacks 12 are arranged in a grid framework structure 14, e.g. in a warehousing or manufacturing environment. The grid framework structure 14 is made up of a plurality of storage columns or grid columns. Each grid in the grid framework structure has at least one grid column to store a stack of containers. FIG. 1 is a schematic perspective view of the grid framework structure 14, and FIG. 2 is a schematic top-down view showing a stack 12 of bins 10 arranged within the grid framework structure 14. Each bin 10 typically holds a plurality of product items (not shown). The product items within a bin 10 may be identical or different product types depending on the application.

The grid framework structure 14 comprises a plurality of upright members 16 that support horizontal members 18, 20. A first set of parallel horizontal grid members 18 is arranged perpendicularly to a second set of parallel horizontal members 20 in a grid pattern to form a horizontal grid structure 15 supported by the upright members 16. The members 16, 18, 20 are typically manufactured from metal. The bins 10 are stacked between the members 16, 18, 20 of the grid framework structure 14, so that the grid framework structure 14 guards against horizontal movement of the stacks 12 of bins 10 and guides the vertical movement of the bins 10.

Figure 3:
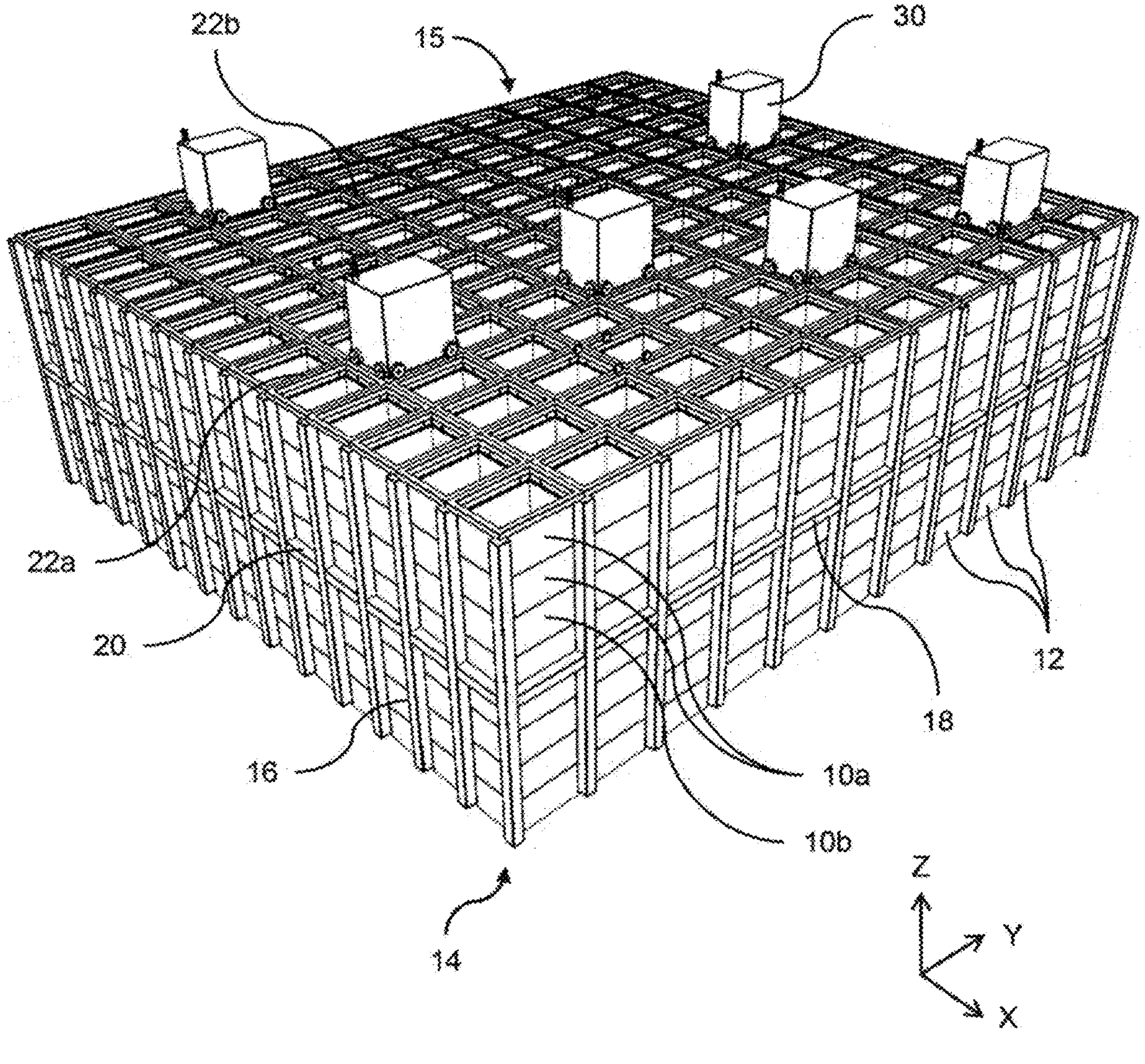
FIG. 3 (PRIOR ART)
FIG. 3 shows load-handling devices on top of the storage structure illustrated in FIG. 1.

The top level of the grid framework structure 14 comprises a grid or grid structure 15, including rails 22 arranged in a grid pattern across the top of the stacks 12. Referring to FIG. 3, the rails or tracks 22 guide a plurality of load-handling devices 30. A first set 22*a* of parallel rails 22 guide movement of the robotic load-handling devices 30 in a first direction (e.g. an X-direction) across the top of the grid framework structure 14. A second set 22*b* of parallel rails 22, arranged perpendicular to the first set 22*a*, guide movement of the load-handling devices 30 in a second direction (e.g. a Y-direction), perpendicular to the first direction. In this way, the rails 22 allow the robotic load-handling devices 30 to move laterally in two dimensions in the horizontal X-Y plane. A load-handling device 30 can be moved into position above any of the stacks 12.

Figure 4:
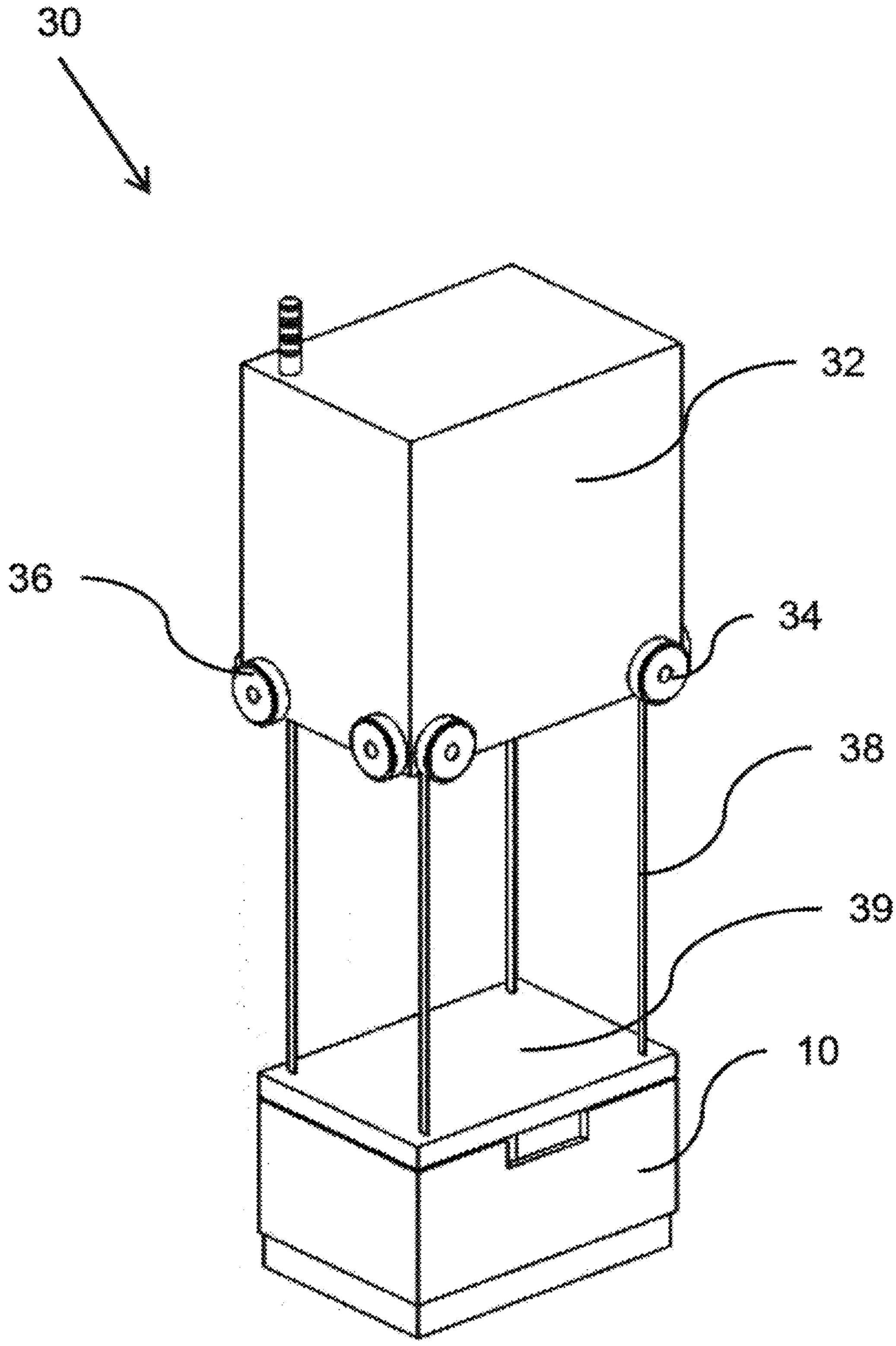
FIG. 4 (PRIOR ART)
FIG. 4 shows a single load-handling device with container-lifting means in a lowered configuration.
Figure 5A:
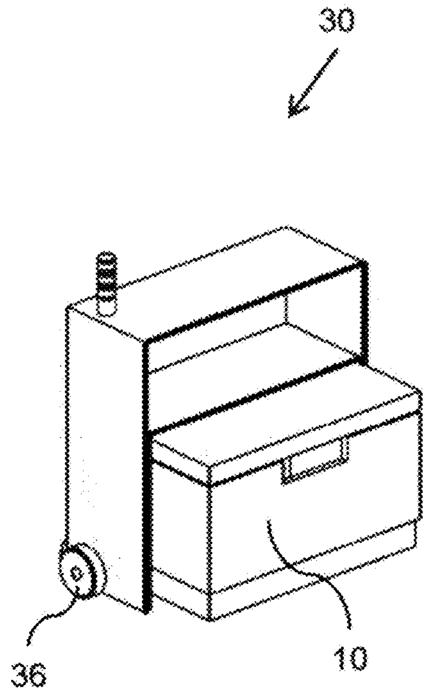
FIG. 5A (PRIOR ART)
FIG. 5A shows a cutaway view of a single load-handling device with container-lifting means in a raised configuration and FIG. 5B shows a cutaway view of a single load-handling device with container-lifting means in a lowered configuration.
Figure 5B:
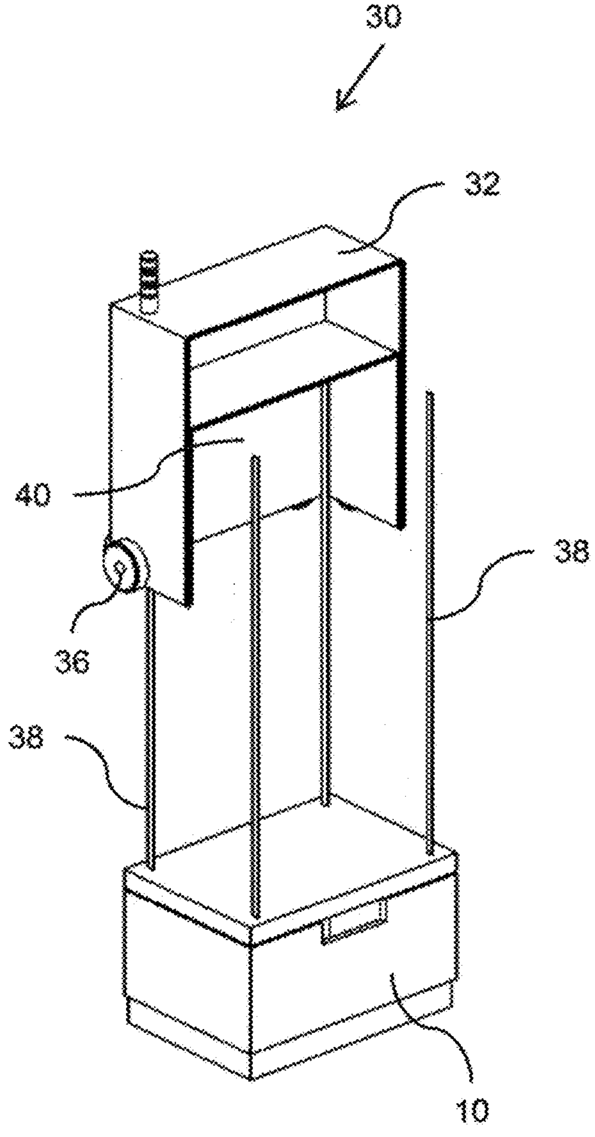
FIG. 5B (PRIOR ART)

A known form of load-handling device 30—shown in FIGS. 4, 5A-5B—is described in PCT Patent Publication No. WO2015/019055 (Ocado), hereby incorporated by reference, where each load-handling device 30 covers a single grid space 17 of the grid framework structure 14. This arrangement allows a higher density of load handlers and thus a higher throughput for a given sized system.

The load-handling device 30 comprises a vehicle 32, which is arranged to travel on the rails 22 of the grid framework structure 14. A first set of wheels 34, consisting of a pair of wheels 34 on the front of the vehicle 32 and a pair of wheels 34 on the back of the vehicle 32, is arranged to engage with two adjacent rails of the first set 22*a* of rails 22. Similarly, a second set of wheels 36, consisting of a pair of wheels 36 on each side of the vehicle 32, is arranged to engage with two adjacent rails of the second set 22*b* of rails 22. Each set of wheels 34, 36 can be lifted and lowered, by way of a direction-change assembly (examples of which are shown in FIGS. 6-13), so that either the first set of wheels 34 or the second set of wheels 36 is engaged with the respective set of rails 22*a*, 22*b* at any one time. For example, when the first set of wheels 34 is engaged with the first set of rails 22*a* and the second set of wheels 36 is lifted clear from the rails 22, the first set of wheels 34 can be driven, by way of a drive assembly (an example of which is shown in FIG. 14) housed in the vehicle 32, to move the load-handling device 30 in the X-direction. To achieve movement in the Y-direction, the first set of wheels 34 is lifted clear of the rails 22, and the second set of wheels 36 is lowered into engagement with the second set 22*b* of rails 22. The drive assembly can then be used to drive the second set of wheels 36 to move the load-handling device 30 in the Y direction.

The load-handling device 30 is equipped with a container-lifting device or assembly, e.g. a crane mechanism, to lift a storage container from above. The lifting device comprises a winch tether or cable 38 wound on a spool or reel and a gripper device 39. The lifting device shown in FIG. 4 (a further example is shown in FIG. 5) comprises a set of four lifting tethers 38 extending in a vertical direction. The tethers 38 are connected at or near the respective four corners of the gripper device 39, e.g. a lifting frame, for releasable connection to a storage container 10. For example, a respective tether 38 is arranged at or near each of the four corners of the lifting frame. The gripper device 39 is configured to releasably grip the top of a storage container 10 to lift it from a stack of containers in a storage system of the type shown in FIGS. 1 and 2. For example, the gripper device 39 may include pins (not shown) that mate with corresponding holes (not shown) in the rim that forms the top surface of bin 10, and sliding clips (not shown) that are engageable with the rim to grip the bin 10. The clips are driven to engage with the bin 10 by a suitable drive mechanism housed within the gripper device 39 powered and controlled by signals carried through the cables 38 themselves or a separate control cable (not shown).

To remove a bin 10 from the top of a stack 12, the load-handling device 30 is first moved in the X- and Y-directions to position the gripper device 39 above the stack 12. The gripper device 39 is then lowered vertically in the Z-direction to engage with the bin 10 on the top of the stack 12, as shown in FIGS. 4 and 5B. The gripper device 39 grips the bin 10, and is then pulled upwards by the cables 38, with the bin 10 attached. At the top of its vertical travel, the bin 10 is held above the rails 22 accommodated within the body of the vehicle 32. In this way, the load-handling device 30 can be moved to a different position in the X-Y plane, carrying the bin 10 along with it, to transport the bin 10 to another location. On reaching the target location (e.g. another stack 12, an access point in the storage system, or a conveyor belt) the bin or container 10 can be lowered from the container receiving portion and released from the gripper device 39. The cables 38 are long enough to allow the load-handling device 30 to retrieve and place bins from any level of a stack 12, e.g. including the floor level.

As shown in FIG. 3, a plurality of identical load-handling devices 30 is provided so that each load-handling device 30 can operate simultaneously to increase the system's throughput. The system illustrated in FIG. 3 may include specific locations, known as ports, at which bins 10 can be transferred into or out of the system. An additional conveyor system (not shown) is associated with each port so that bins 10 transported to a port by a load-handling device 30 can be transferred to another location by the conveyor system, such as a picking station (not shown). Similarly, bins 10 can be moved by the conveyor system to a port from an external location, for example, to a bin-filling station (not shown), and transported to a stack 12 by the load-handling devices 30 to replenish the stock in the system.

Each load-handling device 30 can lift and move one bin 10 at a time. The load-handling device 30 has a container-receiving cavity or recess 40, in its lower part. The recess 40 is sized to accommodate the container 10 when lifted by the lifting mechanism, as shown in FIGS. 5A-5B. When in the recess, the container 10 is lifted clear of the rails 22 beneath, so that the vehicle 32 can move laterally to a different grid location.

If it is necessary to retrieve a bin 10*b* ("target bin") that is not located on the top of a stack 12, then the overlying bins 10*a* ("non-target bins") must first be moved to allow access to the target bin 10*b*. This is achieved by an operation referred to hereafter as "digging". Referring to FIG. 3, during a digging operation, one of the load-handling devices 30 lifts each non-target bin 10*a* sequentially from the stack 12 containing the target bin 10*b* and places it in a vacant position within another stack 12. The target bin 10*b* can then be accessed by the load-handling device 30 and moved to a port for further transportation.

Each of the provided load-handling devices 30 is remotely operable under the control of a central computer. Each individual bin 10 in the system is also tracked so that the appropriate bins 10 can be retrieved, transported and replaced as necessary. For example, during a digging operation, each non-target bin location is logged so that the non-target bin 10*a* can be tracked.

Wireless communications and networks may be used to provide the communication infrastructure from a master controller, e.g. via one or more base stations, to one or more load-handling devices operative on the grid structure. In response to receiving instructions from the master controller, a controller in the load-handling device is configured to control various driving mechanisms to control the movement of the load-handling device. For example, the load-handling device may be instructed to retrieve a container from a target storage column at a particular location on the grid structure. The instruction can include various movements in the X-Y plane of the grid structure 15. As previously described, once at the target storage column, the lifting mechanism can be operated to grip and lift the storage container 10. Once the container 10 is accommodated in the container-receiving cavity 40 of the load-handling device 30, it is subsequently transported to another location on the grid structure 15, e.g. a "drop-off port". At the drop-off port, the container 10 is lowered to a suitable pick station to allow retrieval of any item in the storage container. Movement of the load-handling devices 30 on the grid structure 15 can also involve the load-handling devices 30 being instructed to move to a charging station, usually located at the periphery of the grid structure 15.

To maneuver the load-handling devices 30 on the grid structure 15, each of the load-handling devices 30 is equipped with motors for driving the wheels 34, 36. The wheels 34, 36 may be driven via one or more belts connected to the wheels or driven individually by a motor integrated into the wheels. For a single-cell load-handling device (where the footprint of the load-handling device 30 occupies a single grid space 17), and the motors for driving the wheels can be integrated into the wheels due to the limited availability of space within the vehicle body. For example, the wheels of a single-cell load-handling device are driven by respective hub motors. Each hub motor comprises an outer rotor with a plurality of permanent magnets arranged to rotate about a wheel hub comprising coils forming an inner stator.

The system described with reference to FIGS. 1 to 5 has many advantages and is suitable for a wide range of storage and retrieval operations. In particular, it allows very dense storage of products and provides a very economical way of storing a wide range of different items in the bins 10 while also allowing reasonably economical access to all of the bins 10 when required for picking.

Figure 6:
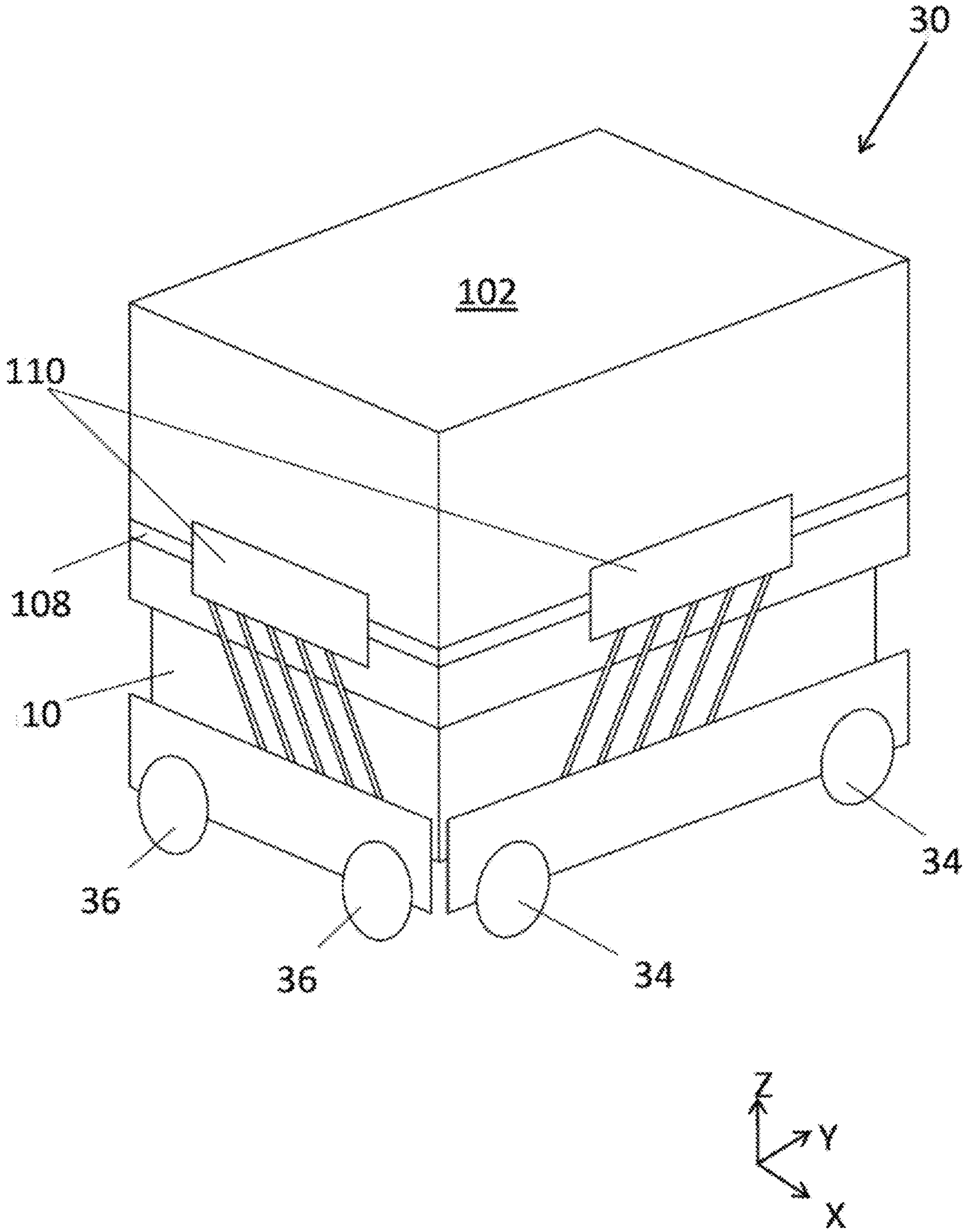
FIG. 6 is a schematic illustration of a load-handling device with a direction-change mechanism.

An example direction-change assembly is shown in FIG. 6, where the first and second sets of wheels 34, 36 can be raised clear of the rails or lowered onto the rails. The direction-change assembly comprises compliant mechanism (s) 110 (or linkage sets 300 shown in FIGS. 9 and 10, or cam mechanisms or cams 120, 130 as shown in FIGS. 11 to 13) located on opposed faces of the load-handling device body or skeleton 102.

Figures 7A, 7B, 7C:
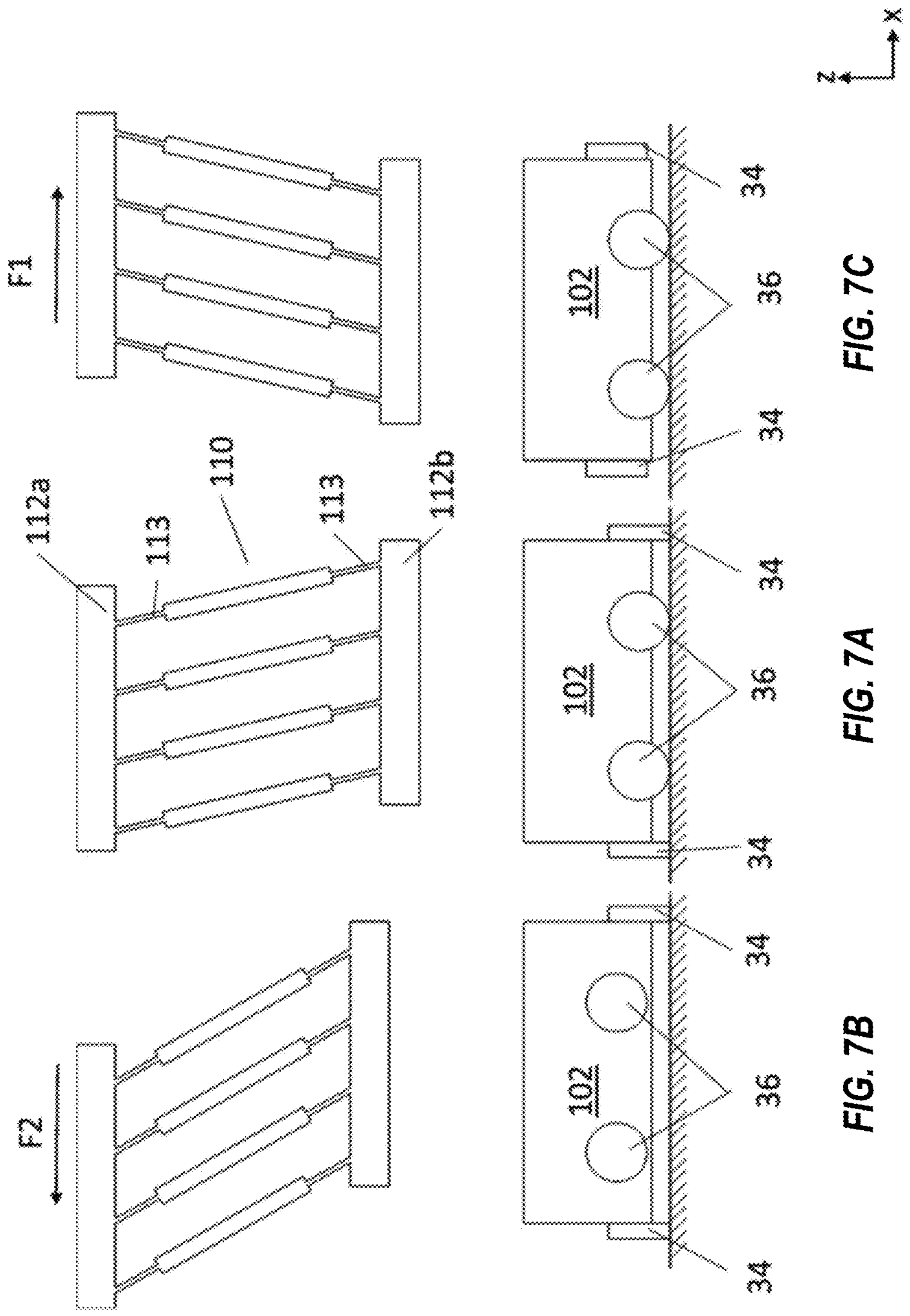
FIGS. 7A-7C show schematic illustrations of a compliant mechanism for use in engaging first and second sets of wheels of load-handling devices, as part of a direction-change assembly.
Figure 8C:
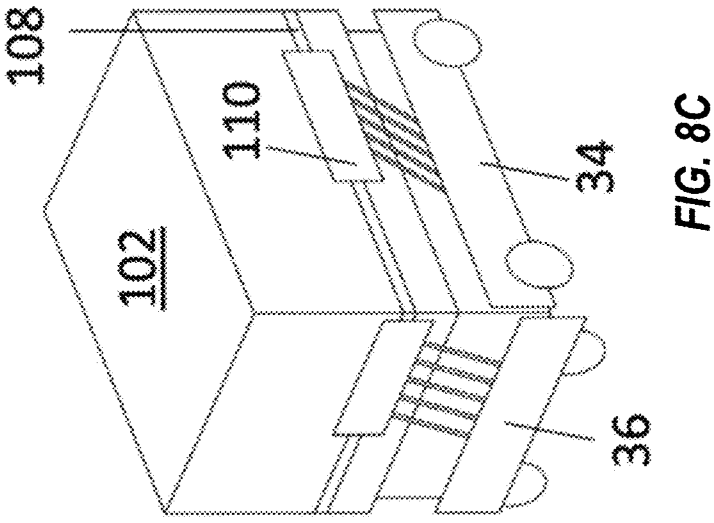
FIGS. 8A-8C show a perspective view of a load-handling device showing the compliant mechanism and wheel position in similar positions to the positions shown in FIGS. 7A-C.
Figure 8A:
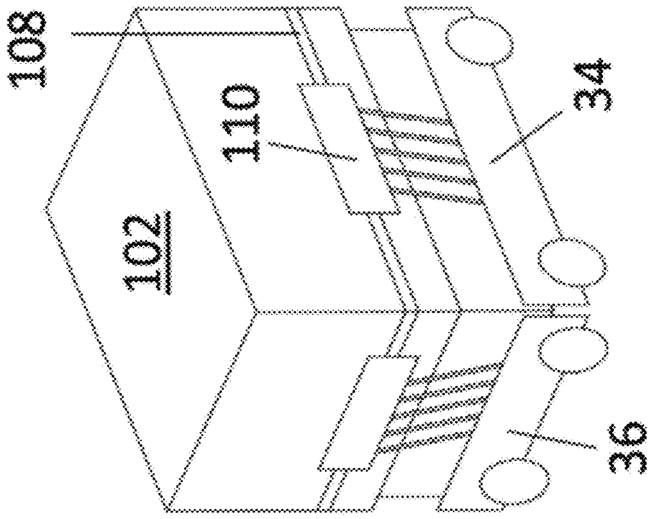
Figure 8B:
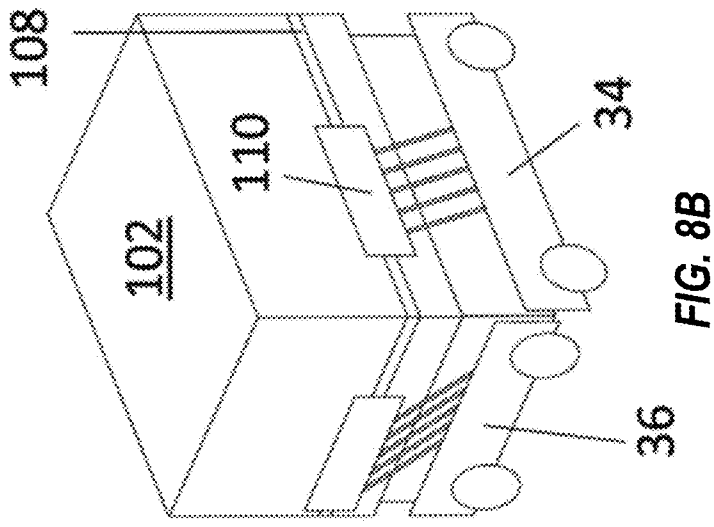

The direction-change compliant mechanisms 110 (further described in PCT Publication No. WO2021175922A1 (Ocado)) are each deformable in first and second directions. FIGS. 7A-7C illustrate the compliant mechanism 110 in three positions and, below that, the position of the wheels 34, 36 relative to the vehicle body or skeleton 102 and rails in each of the positions. FIGS. 8A-8C are perspective views of a load-handling device showing the compliant mechanism 110 (or linkage-sets 300, or cam mechanisms 120, 130) and wheel position in similar positions to the positions shown in FIGS. 7A-7C.

When there is no input force, the compliant mechanism 110 is at rest or in a neutral position, i.e. the compliant mechanism 110 is not elastically deformed, and both sets of wheels 34, 36 are level and are resting on a surface. In this arrangement, the load-handling device is unable to move in the x- nor y-directions and the load-handling device is parked, FIGS. 7A and 8A. The elastic deformation of the compliant mechanism 110 is linked to arms holding each of the wheels and movable in a vertical (or z-) direction to raise and lower the wheels.

When a first input force F1 is provided, the compliant mechanism 110 body deforms in a first direction. The displacement of the mechanism body is translated to a vertical direction to lower the first set of wheels 34, and raise the second set of wheels 36. The wheels of the first set of wheels 34 move downwards to engage with the rails and to support the vehicle and the wheels of the second set of wheels 36 move upwards to be clear of the rails, as shown in FIGS. 7C and 8C. Thus, the vehicle 32 may be driven in the x-direction.

When a second input force F2 is provided, in a direction opposed to the first input force, the compliant mechanism 110 body deforms in a second direction. The displacement of the mechanism body is translated to operate in a vertical direction to raise the first set of wheels 34, and lower the second set of wheels 36 so that the load-handling device is supported by the second set of wheels 36 and may be driven in the y-direction, FIGS. 7B and 8B.

The compliant mechanism 110 is connected to the sets of wheels 34, 36 via a transfer linkage. Thus, in this way, the compliant mechanism 110 (or linkage-sets 300 or cams 120, 130) provides means for changing the operational direction of travel of the load-handling device 30.

It will be appreciated that the compliant mechanism 110 illustrated in FIGS. 7A-7C comprises a series columns or trunk portions attached to rails or braces. The columns or trunk portions 111 are attached to the rails or braces 112*a,b* via relatively narrow sections which bend preferentially when a horizontal force is applied to the rails or braces. Accordingly, the narrow sections may be considered to be hinges 113.

Figure 9:
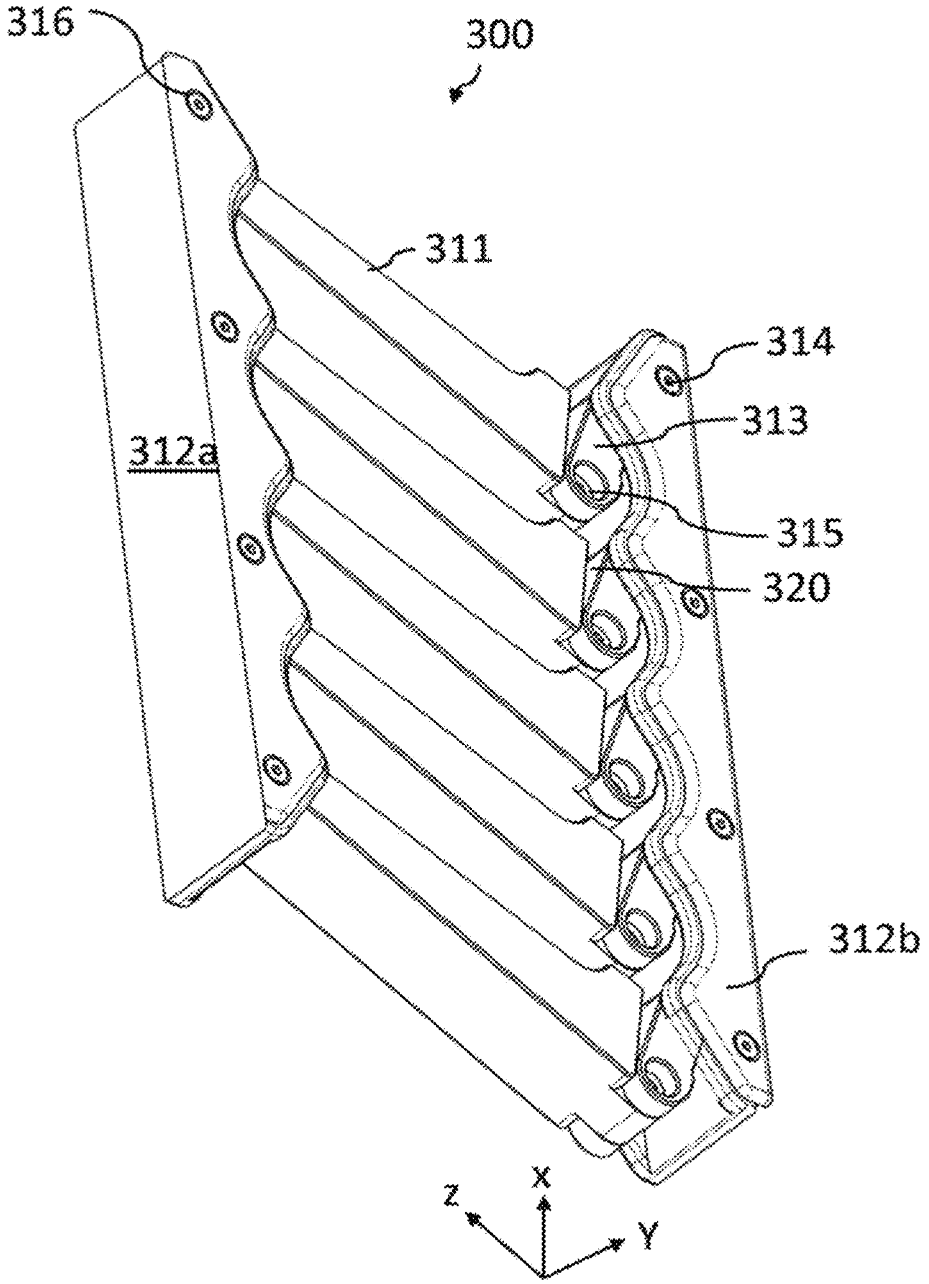
FIG. 9 shows a perspective view of a rigid-body linkage-set for use in engaging first and second sets of wheels of load-handling devices, as part of a direction-change assembly.

FIGS. 9 and 10 show an example of a rigid-body linkage-set 300 (further described in PCT Publication No. WO2021175922A1 (Ocado)) for use in engaging first and second sets of wheels of load-handling devices, as part of a direction-change assembly having a similar functional behavior to the compliant mechanisms 110 described above.

The linkage-set mechanism 300 comprises a series of pivotally connected two-part linkages. Considering a single two-part linkage, at one end a primary linkage member (truck portion) 311 is pivotally attached to the traveler or upper brace 312*a* at knee joint 316, and the opposing end is hingedly attached to a secondary linkage member (branch portion) 313 at ankle joint 314. The opposing end of the secondary linkage 313 is pivotally attached to the fixed or lower brace 312*b* at toe hinge 315. Thus, each single two-part linkage extends between the traveler 312*a* and the fixed brace 312*b*. To make the linkage-set 300, a series of similar two-part linkages are arranged in parallel between the traveler or upper brace 312*a* and the fixed or lower brace 312*b* to make up a linkage set 300, as shown in FIG. 9.

The rotation or angular motion of the knee joint 316, ankle joint 314 and toe jhinge 315 are limited as will be described below. At the ankle joint 314, the primary linkage 311 has a single knuckle which slots between two knuckles of the secondary linkage 313.

Figure 10A:
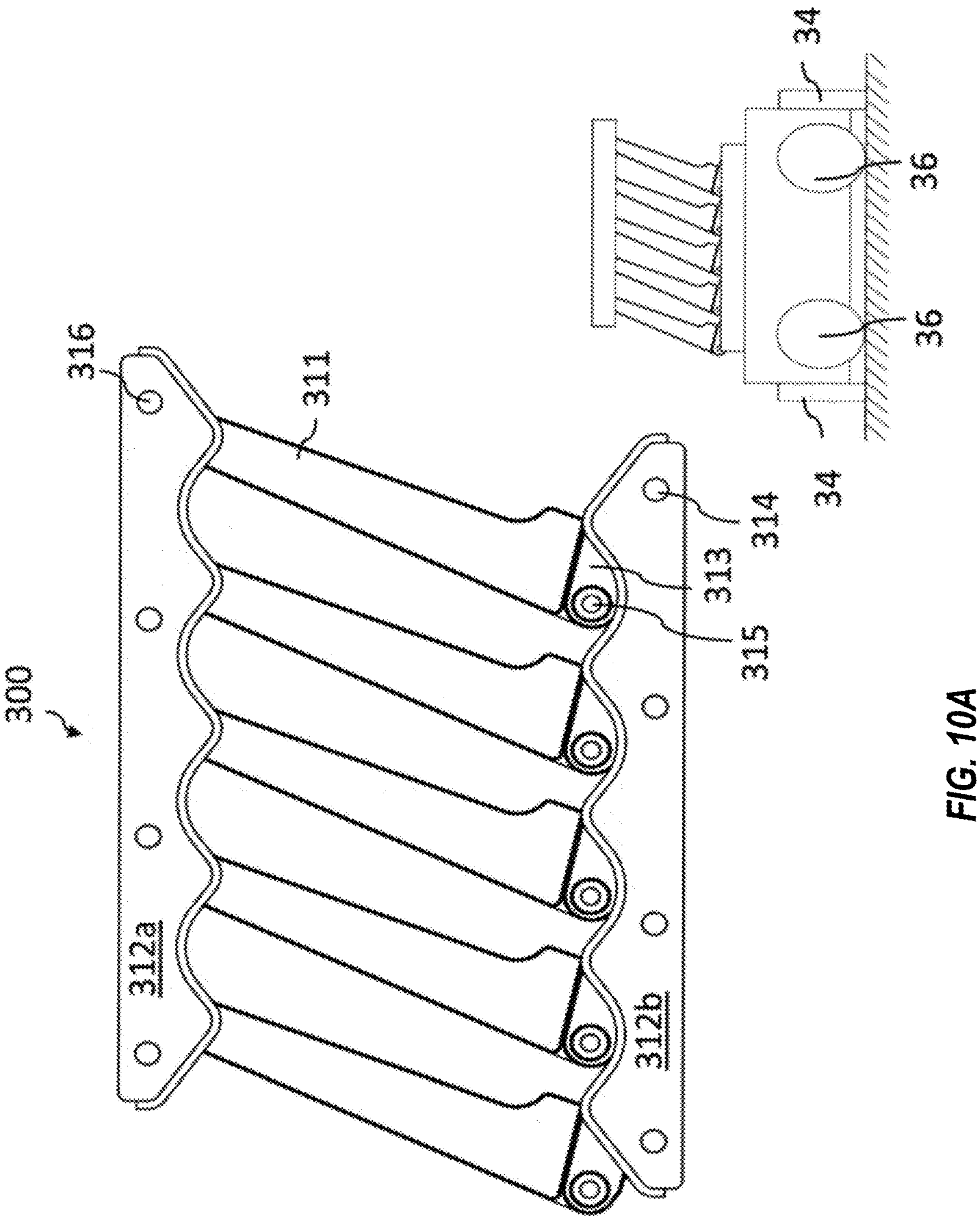
FIGS. 10A-10C show a schematic illustration of the linkage-set for use in engaging first and second sets of wheels of load-handling devices, as part of a direction-change assembly.

FIG. 10A shows the linkage-set in a neutral or parked position, where the first set of wheels 34 and the second set of wheels 36 would be engaged with the track (shown in the thumbnail) and the load-handling device 30 is unable to travel in the x-direction nor the y-direction. In this position, no force F is applied to the traveler 312*a*, and the lower face 319 of the primary linkage 311 rests against the upper face 320 of the secondary linkage 313.

Figure 10B:
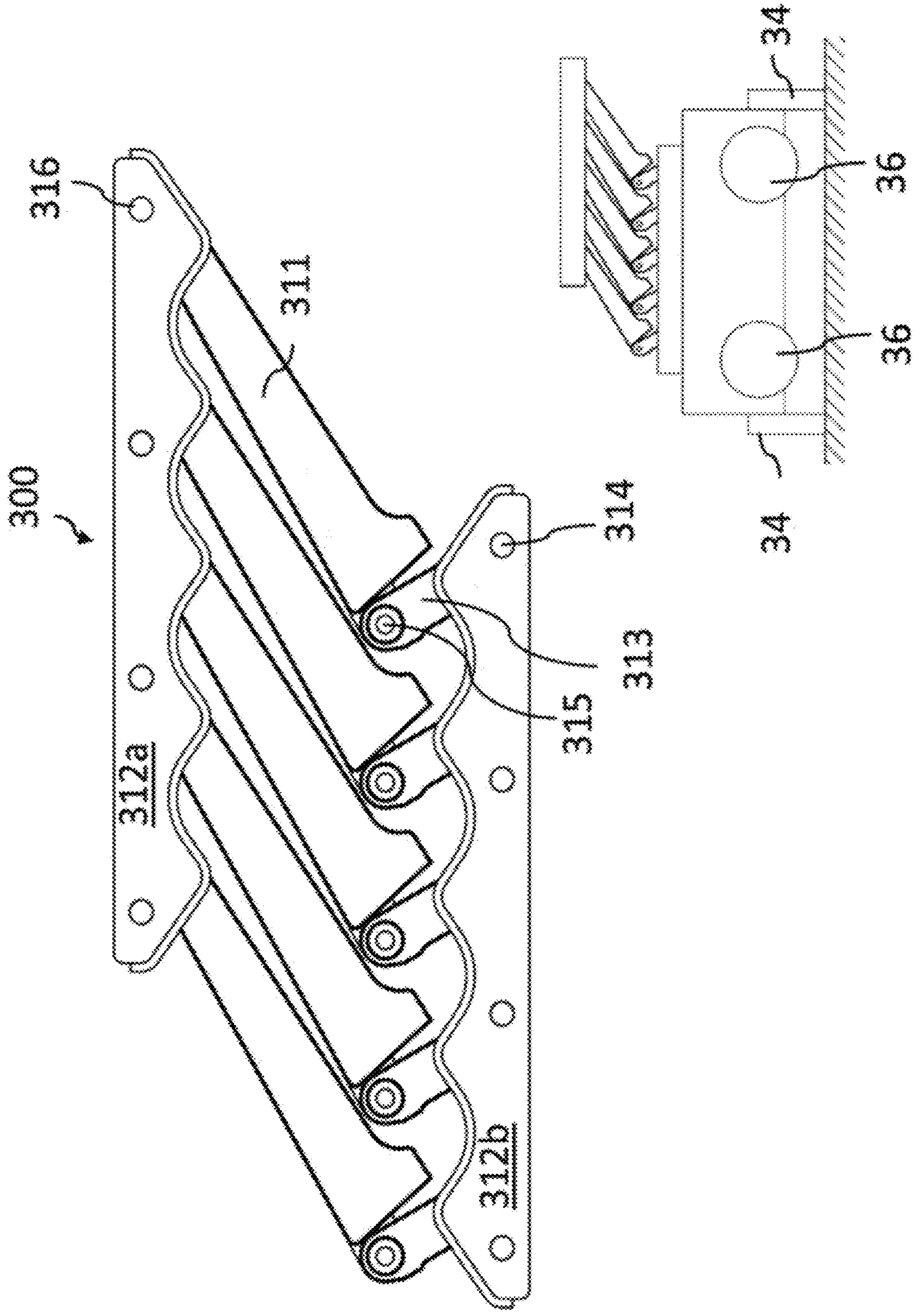

In FIG. 10B a positive force F (i.e. from left to right as illustrated) has been applied to the traveler 312*a*. Applying a positive force F causes primary linkage 311 to rotate clockwise about the knee joint 316 and anti-clockwise about the ankle joint 314. Rotation about the ankle joint 314 is limited by face 317 meeting surface 318. By moving the traveler 312*a* further to the right, the secondary linkage 313 lifts away from the fixed brace 312*b* by rotating in a clockwise direction about the toe hinge 315. Thus, the traveler 312*a* is displaced horizontally in a positive direction relative to the fixed brace 312*b*. With the positive displacement of the traveler 312*a* the first set of wheels 34 are raised and the second set of wheels 36 are lowered to be engaged with the track (shown in the thumbnail), and the load-handling device 100 would be able to travel in the y-direction.

Figure 10C:
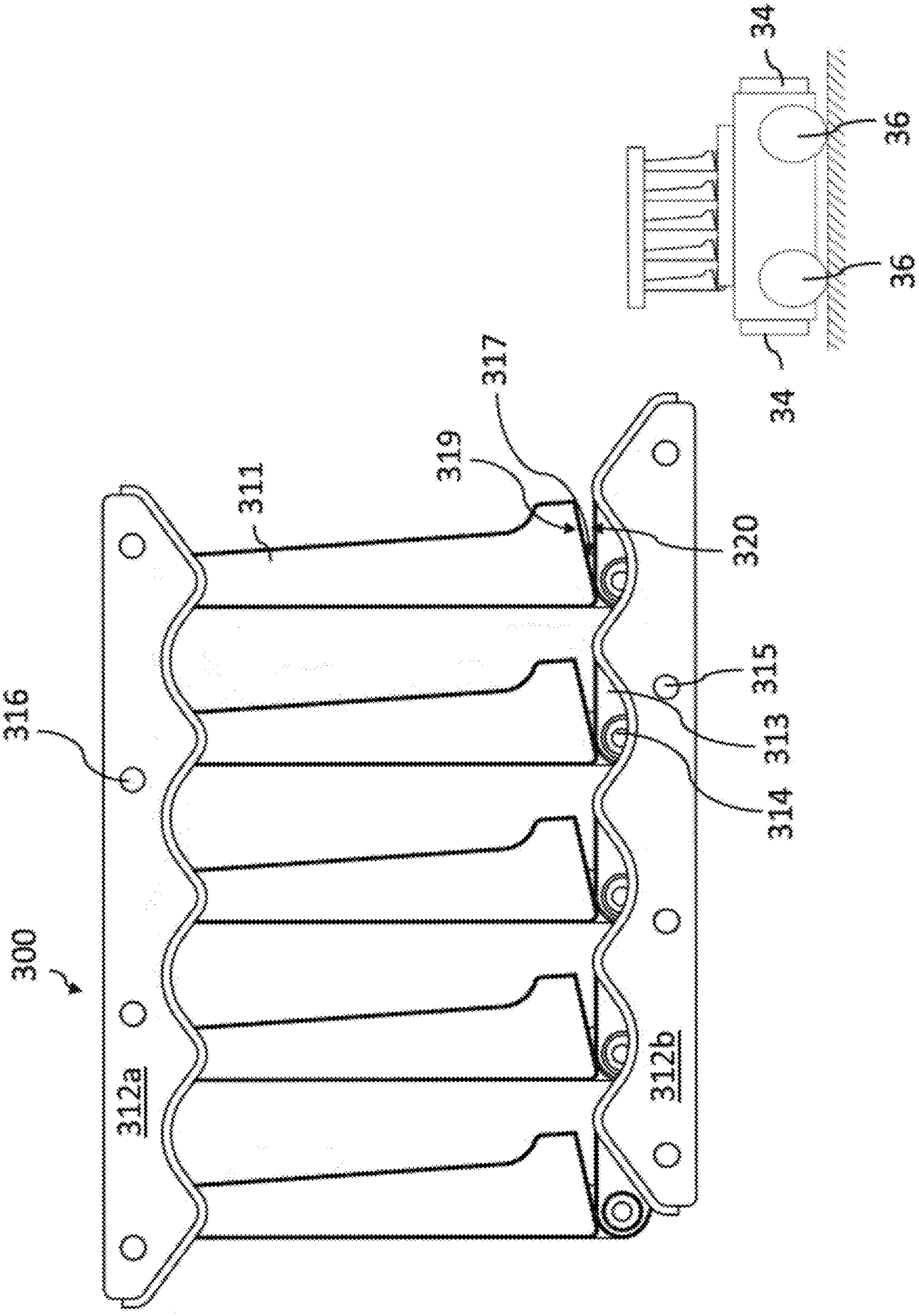

In FIG. 10C a negative Force F (i.e. from right to left as illustrated) has been applied to the traveler 312*a*. Applying a negative force F causes the primary linkage 311 to rotate anticlockwise about the knee joint 316 and clockwise about the ankle joint 314. Rotation about the ankle joint 314 is limited by face 317 meeting surface 321 and the heels of the two-part linkages are pushed into the fixed brace 312*b*. Thus, the traveler 312*a* is displaced horizontally in a negative direction relative to the fixed brace 312*b*. With the negative displacement of the traveler 312*a* the first set of wheels 34 are lowered to be engaged with the track and the second set of wheels 36 are raised (shown in the thumbnail), and the load-handling device 30 would be able to travel in the x-direction.

It will be appreciated that between the x-direction travel position and the y-direction travel position the linkage-set moves through the neutral or parked position.

Figure 11A:
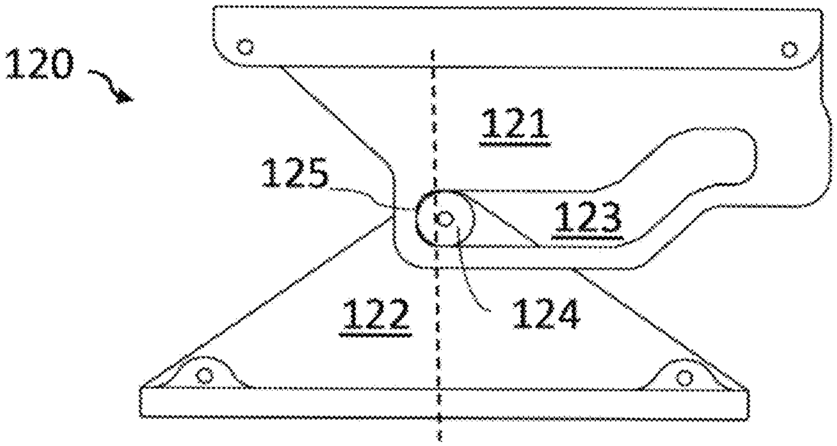
FIGS. 11A-11C and FIG. 12 show a cam mechanism for use in engaging first and second sets of wheels of load-handling devices, as part of a direction-change assembly.
Figure 11B:
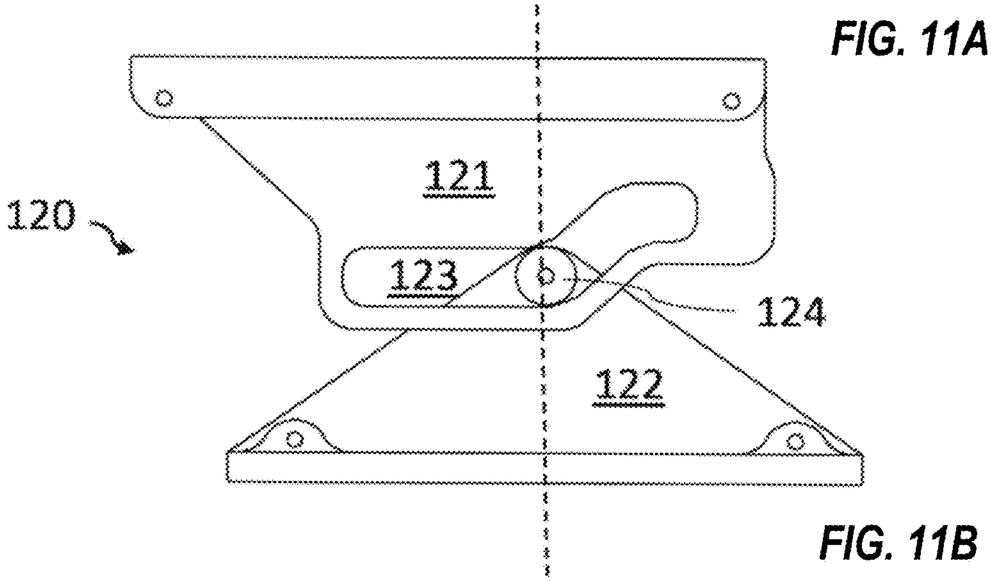
Figure 11C:
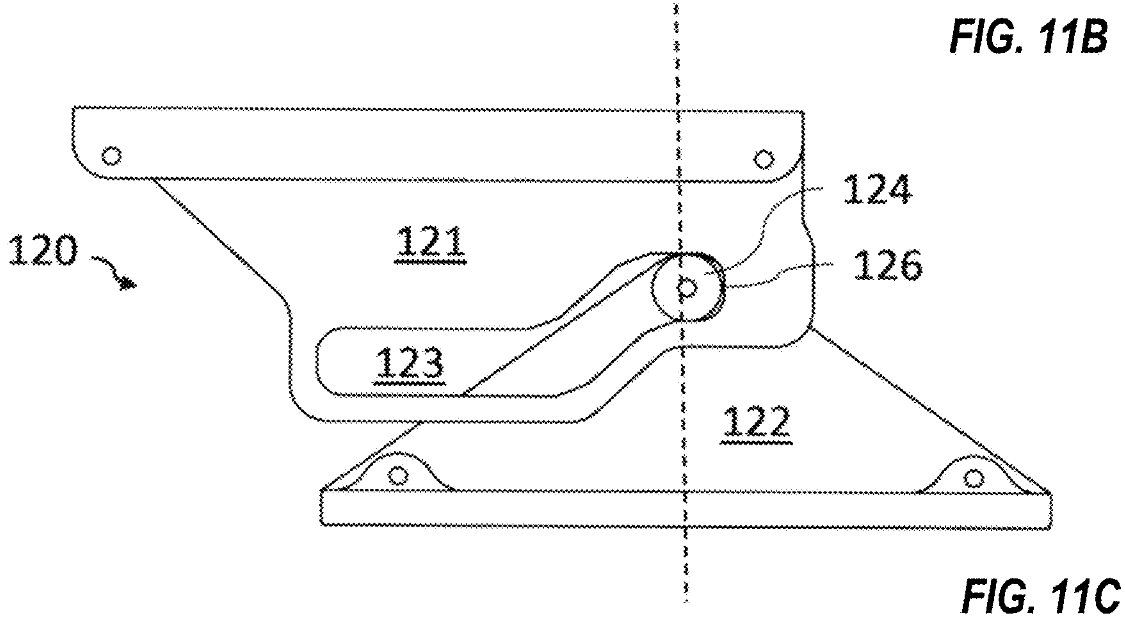
Figure 12:
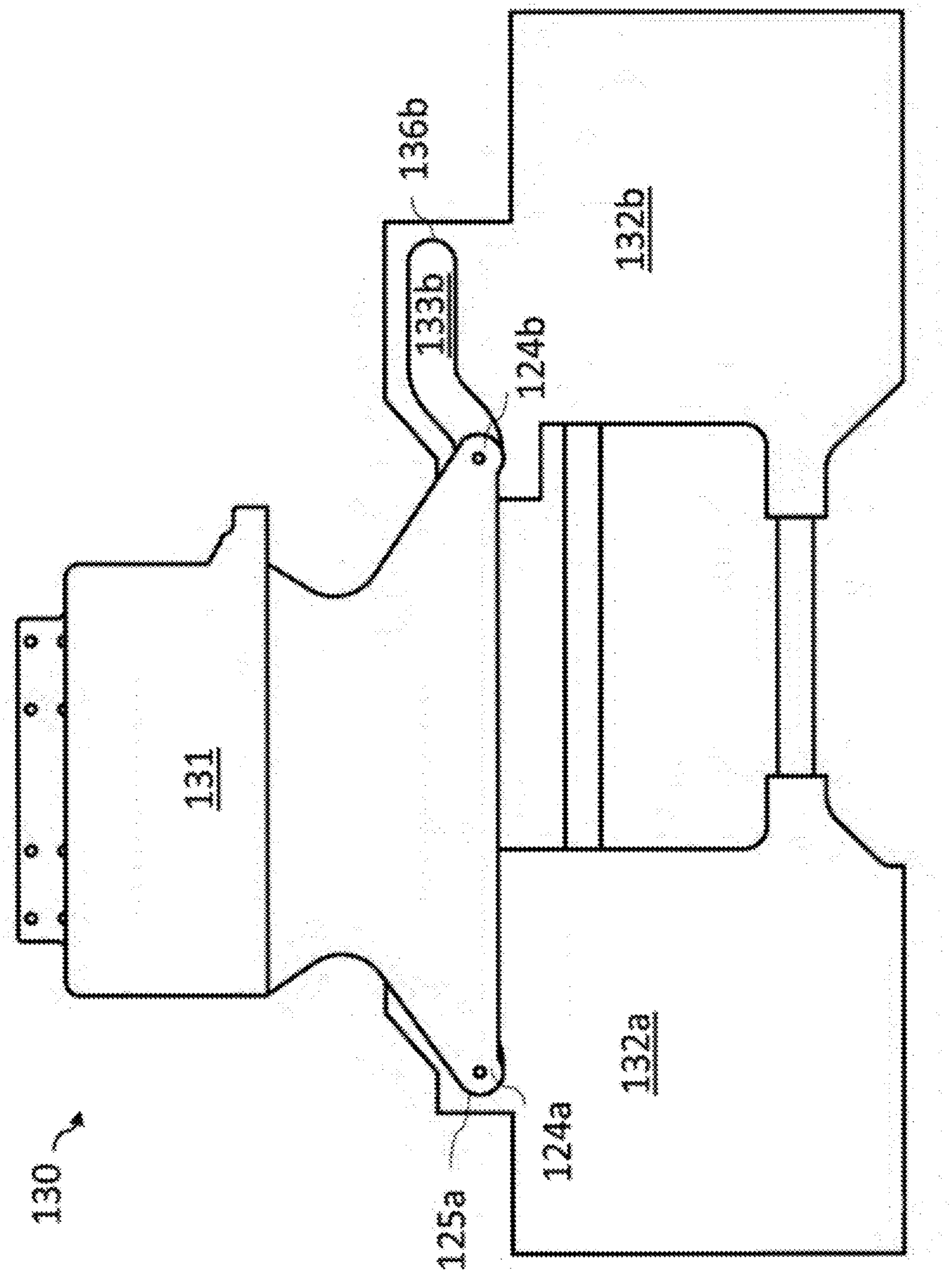

FIGS. 11A-11C illustrate yet another example direction-change mechanism incorporating a cam mechanism direction-change assembly component (further described in PCT application no. PCT/EP2022/073670 (Ocado)). FIGS. 11A-11C illustrates a cam mechanism 120 for use in a direction-change assembly, for example, of the type described in connection with FIG. 6. The cam mechanism 120 comprises a traveler 121 (similar to 112*a*, 312*b*), a fixed brace 122 (similar to 112*b* or 312*b*), a cam profile 123 arranged as a slot in the face surface of the traveler 121 and a follower 124 engaged with the cam 123 and extending between opposed faces or covers of the fixed brace 122. It will be appreciated that the fixed brace 122 may be made from a single piece or block having a depth sufficient to have a slot to accommodate the depth of the traveler 121, and arranged to hold the follower 124 in place, or the fixed brace 122 could be made from two planes of material clamped together with the follower 124 fixed therebetween.

The cam or slot profile 123 extends between a first limit 125 and a second limit 126. Between the limits, as illustrated the slot extends from the first limit 125 substantially horizontally, slops upwards and then continues substantially horizontally to the second limit 126 with enough space to accommodate the follower 124.

In a first arrangement of the cam mechanism 120 arrangement shown, the traveler 121 is able to move horizontally and is fixed in a vertical direction while the fixed brace 122 is fixed horizontally and is able to move vertically. Accordingly, as the cam 123 moves horizontally across the follower from the first limit 125 to the second limit 126 the fixed brace 122 will be raised by an amount equal to the vertical change in the profile of the cam 123. It will be appreciated that, alternatively in a second arrangement, the fixed brace 122 may be able to move horizontally while being fixed in a vertical direction and the traveler 121 may be fixed in the horizontally direction and able to move vertically. The relative positions between the traveler 121 and the fixed brace 122 according to the first arrangement are illustrated in FIG. 12, which shows the cam 120 in various positions.

FIGS. 11A-C illustrate the cam mechanism of FIG. 12 where the front face of the fixed brace 122 has been removed such that it is easier to see and understand the position of the follower 124. The vertical dotted line is positioned through the follower 124 to assist in the understanding of the relative position of the cam mechanism 120 between the views.

In FIG. 11A, the traveler 121 has been positioned horizontally to the right. The follower 124, which is connected to the fixed brace 122 is positioned at the first limit 125 of the cam 123. In FIG. 11B, the traveler 121 has been positioned centrally, left of the position in FIG. 8A. From the position shown in FIG. 8A, the cam 123 has moved relative to the follower 124 such that the follower 124 is located at the first inflection point of the cam slot. The fixed brace 122 has not moved its position relative to its position in FIG. 8A. In FIG. 11C, the traveler 122 has been positioned horizontally to the left. The cam 123 has moved relative to the follower 124 such that the follower 124 has had to move vertically to be up the slope to be located at the second limit 126. As the follower 124 is fixed to the fixed brace 122, and as the fixed brace 122 is fixed horizontally, necessarily, the fixed brace 122 is moved vertically. In FIGS. 11A-11B the fixed brace 122 is in a lowered position relative to the traveler 121, while in FIG. 8C the fixed brace 122 is in a raised position relative to the traveler 121.

It will be appreciated that if a pair of wheels were fixedly attached to the fixed brace 122 then the cam mechanism 120 could be used to raise and lower the wheels as required by applying a horizontal force to the traveler 121. The position of the cam 120 shown in FIG. 11B could be used as a 'park' position, where the wheels are ready to be moved into engaged (FIG. 11A) or disengaged (FIG. 11C) positions. It will be appreciated that the cam profile may be designed to provide any desired horizontal to vertical movement profile.

Figure 13A:
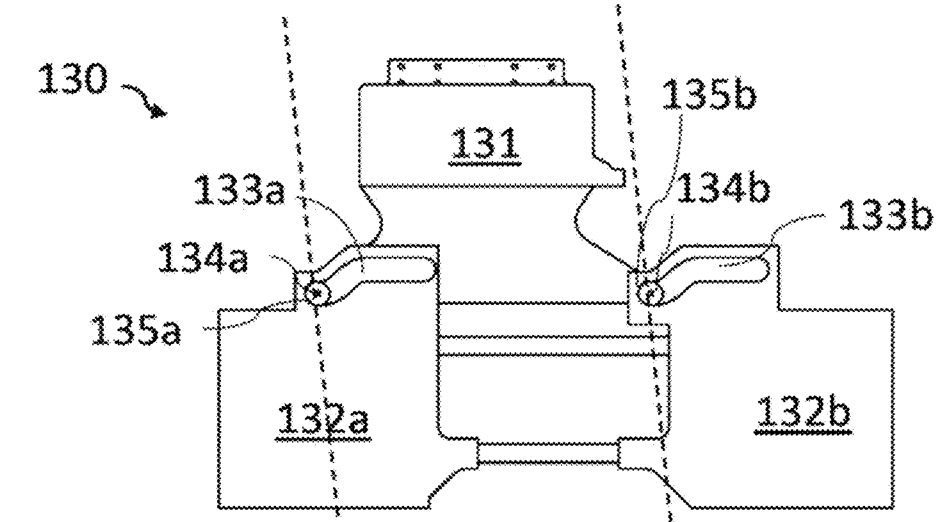
FIGS. 13A-13C show a double cam mechanism for use in engaging first and second sets of wheels of load-handling devices, as part of a direction-change assembly.
Figure 13B:
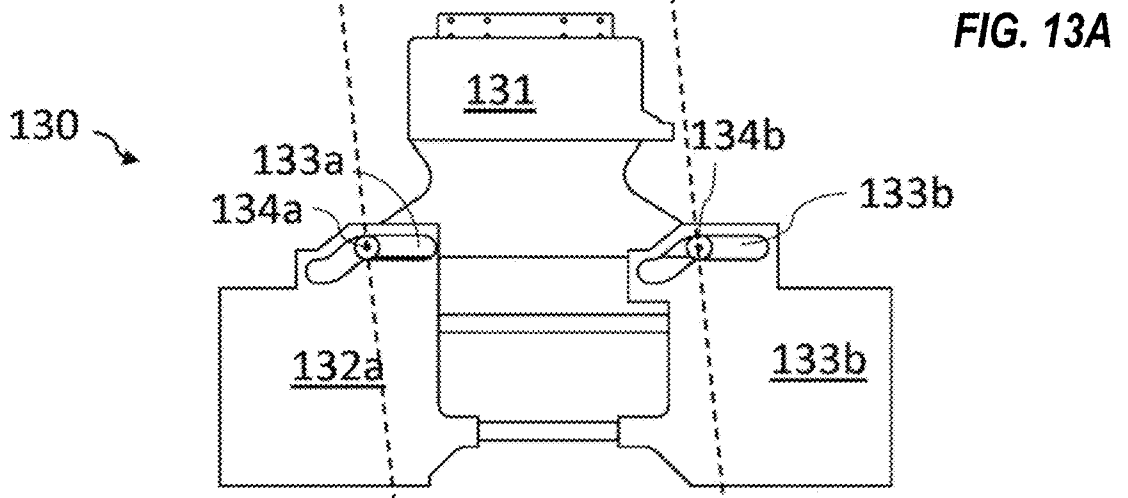
Figure 13C:
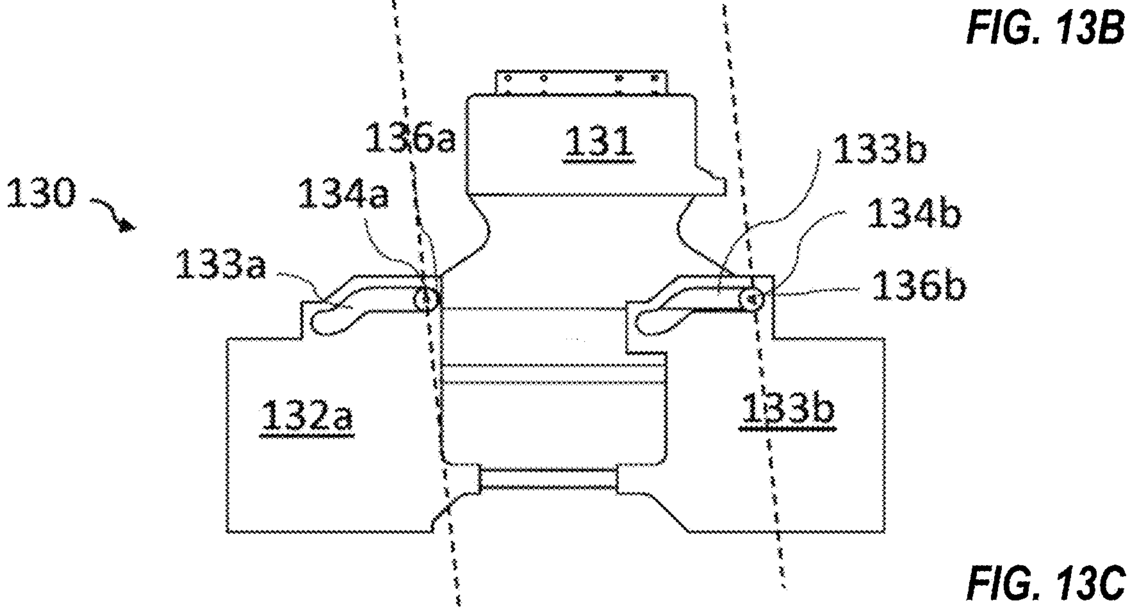
Figure 14:
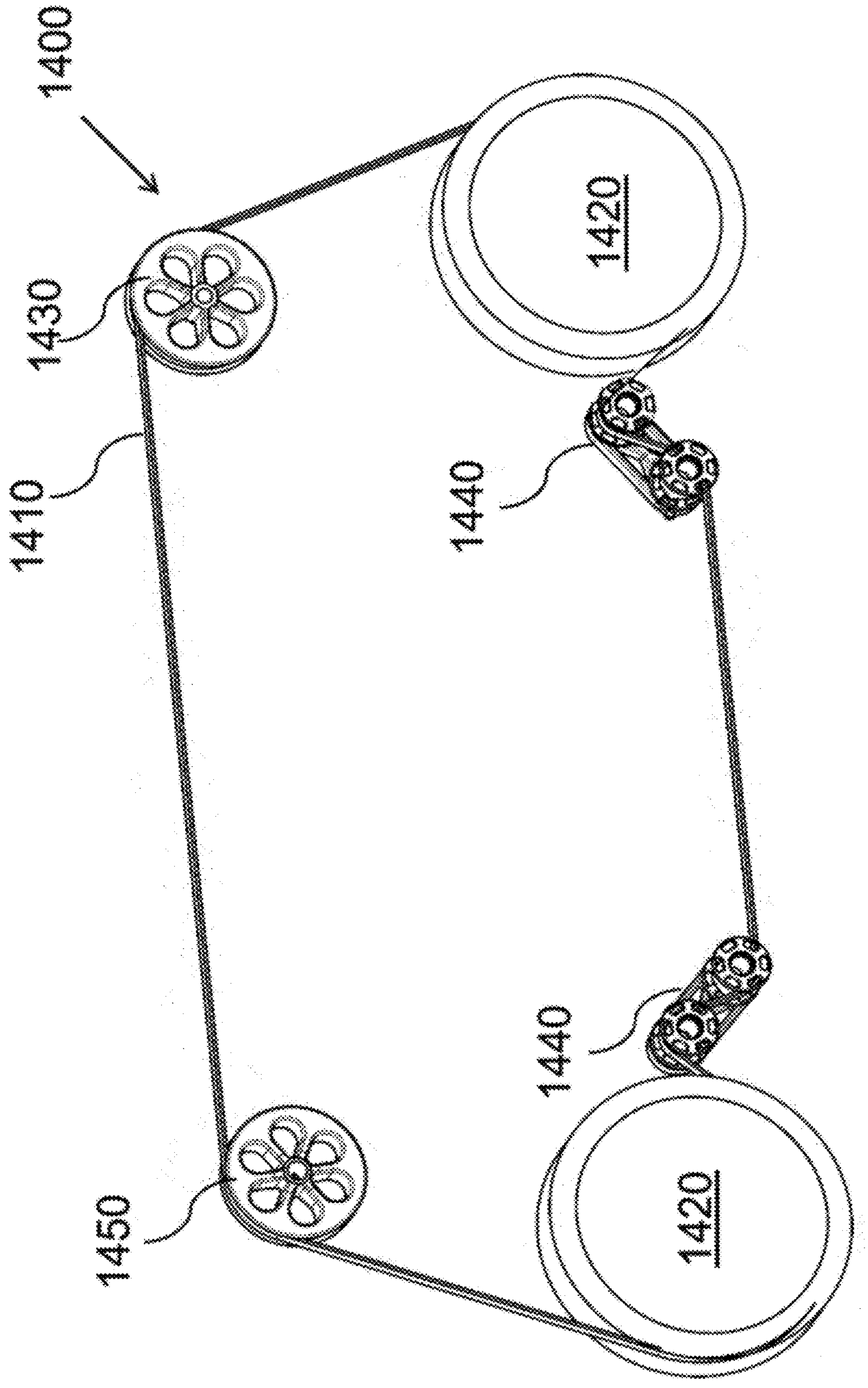
FIG. 14 shows an example drive assembly used in a load-handling device.

FIGS. 13A-13C illustrate another cam mechanism 130, employing a double cam arrangement. A first cam 133*a* and a second cam 133*b* are arranged horizontally adjacent. The first cam profile and the second cam profile are substantially identical. Likewise, a pair of followers 124*a* and 124*b* are arranged to engage with the respective cams 133*a*, 133*b*. This arrangement further differs from the arrangement shown in FIGS. 11A-11C in that the first cam 133*a* and the second cam 133*b* are arranged on the fixed brace 132*a*, 132*b* while the first follower 124*a* and the second follower 124*b* are attached to the traveler 131, i.e. it is inverted. Portions of fixed brace 132*a*, 132*b* are joined by a pair of bars.

Operation of the cam mechanism 130 is similar to that of the cam mechanism 120. Where a horizontal force is applied to the traveler 131, the followers 124*a* and 124*b* move in unison along the paths of the first cam 133*a* and the second cam 133*b*, respectively, between a first limit 125*a*, 125*b* and a second limit 136*a*, 136*b*. Assuming that the fixed brace 132*a*, 132*b* is restricted to only move in a vertical direction, horizontal movement of the traveler 131 results in the fixed brace 132*a*, 32*b* being raised and lowered, similarly to the function of the cam mechanism 120. FIGS. 10A-10C illustrate the inverted double cam mechanism 130 in positions corresponding to the positions shown of the single cam mechanism 120 in FIGS. 11A-11C respectively. It will be appreciated that any number of cams can be used.

As can be seen in FIGS. 6 and 8, a first pair of compliant mechanisms 110 (or linkage sets 300 shown in FIGS. 9 and 10, or cam mechanisms 120, 130 as shown in FIGS. 11-13) are positioned on opposed faces within the body or skeleton 102 of the load-handling device for controlling the position of the first set of wheels 34, and a second pair of compliant mechanisms 110 (or linkage sets 300, or cam mechanisms 120, 130) are positioned on orthogonal opposed faces within the body or skeleton of the load-handling device for controlling the position of the second set of wheels 36. Thus, each face of the load-handling device comprises a compliant mechanism 110, or linkage set 300, or cam mechanisms 120, 130. The pairs of compliant mechanisms 110, or linkage sets 300, or cam mechanisms 120, 130 are coupled via a transfer or drive belt 108 that substantially circumnavigates the load-handling device skeleton 102, and is mechanically coupled to the upper braces or traveler 112*a*, 312*a* of the compliant mechanisms 110, linkage set 300, or traveler 121 of the cam mechanism direction-change assembly component.

The output of the compliant mechanisms 110 or linkage sets 300, or cam mechanisms 120, 130 is transferred to the wheels 34, 36 via a chassis which translates the horizontal movement of the compliant mechanism to a vertical movement of the wheels. In some arrangements, the upper braces or traveler 112*a*, 312*a* of the compliant mechanisms 110, linkage set 300, or traveler 121 of the cam mechanism may be attached to a rod arrangement extending along a face of the load-handling device 30 between each of the horizontal edges of the load-handling device 30 via a glide bearing. In turn the rod arrangement may be attached to corner pieces at first and second ends.

The wheel sets 34, 36 can be moved in unison, for example via motors to engage x- and/or y-direction wheel sets with the rails of a storage system grid. In this way, the direction-change assembly may be operated by two motors located in opposite or adjacent corners. The use of two motors increases the torque delivered to the drive belt. In some examples of the load-handling device 30, both motors may be arranged in or near respective opposite or adjacent corner pieces so as not to occupy space within the skeleton or body, and for accessibility. Activating the motors in a clockwise direction may move a wheel mount on the face upwards to raise the wheels on the face, and lower the wheels on the face, perpendicular to the first face—or vice versa.

In some examples of the direction-change assembly, the transfer or drive belt 108 may pass over one or more idler pulleys for monitoring the rotation rate when moving between positions to engage the x- and y-directions to provide instant detection of belt 108 failure. If the belt 108 or another part of the direction-change assembly were to fail, then this information could be fed back to and exploited by the central control facility to prevent bot collisions.

An example drive assembly 1400 for the sets of wheels 34, 36 is shown in FIG. 14. A drive belt assembly is provided for each set of wheels 34, 36. The drive belt assembly comprises a drive belt pulley gear arrangement for engaging with a toothed edge of a pair of wheels 34, 36 on one side of the load-handling device 30, as illustrated in FIG. 14. A toothed drive belt 1410 engages with both of the wheels 1420 (which correspond to one pair of wheels of the set of wheels 34 or 36). The drive belt 1410 is guided by a first drive wheel 1430 and a second drive wheel 1450 mounted on the load-handling device, and two tensioning wheel arrangements 1440. The tensioning wheel arrangements are movably mounted to the load-handling device with springs (not shown), and are intended to keep the drive belt taut and maintain engagement of the drive belt with the wheels. A drive wheel 1450 is provided, mounted to the load-handling device. The first drive wheel 1430 and a second drive wheel 1450 are linked to the axles of a respective motors (not shown in FIG. 14). The use of two motors increases the torque delivered to the drive belt.

The load-handling device is provided with drive assemblies 1400 for each pair of wheels. The pairs of wheels on opposed sides comprise a set of wheels 34, 36. The drive wheels on opposed sides of the load-handling device may share a common motor axle so that each pair of wheels of sets of wheels 34, 36 are driven at the same time and at the same speed. The first set of wheels 36 and the second set of wheels 34 may be selectively driven under the control of the load-handling device.

In the arrangement of FIG. 14, it will be appreciated that when the set of wheels 34, 36 are moved out of position for engagement with the grid track, the drive belt may become slack because the distance between the upper portion of the drive belt assembly and the wheels changes as the wheels are lowered and raised. Accordingly, depending on the direction-change assembly selected, additional tensioning mechanisms may be required. For example, an idler pulley on a mechanical linkage connected to the direction-change assembly may be employed to keep the notional drive belt length constant throughout the full range of motion of the direction-change assembly. Therefore, the drive belt tension is optimized. Further, when the bot is moving in either the x-direction or y-direction, the drive belt tension should be optimized taking into account drive belt slip and efficiency.

Figure 15:
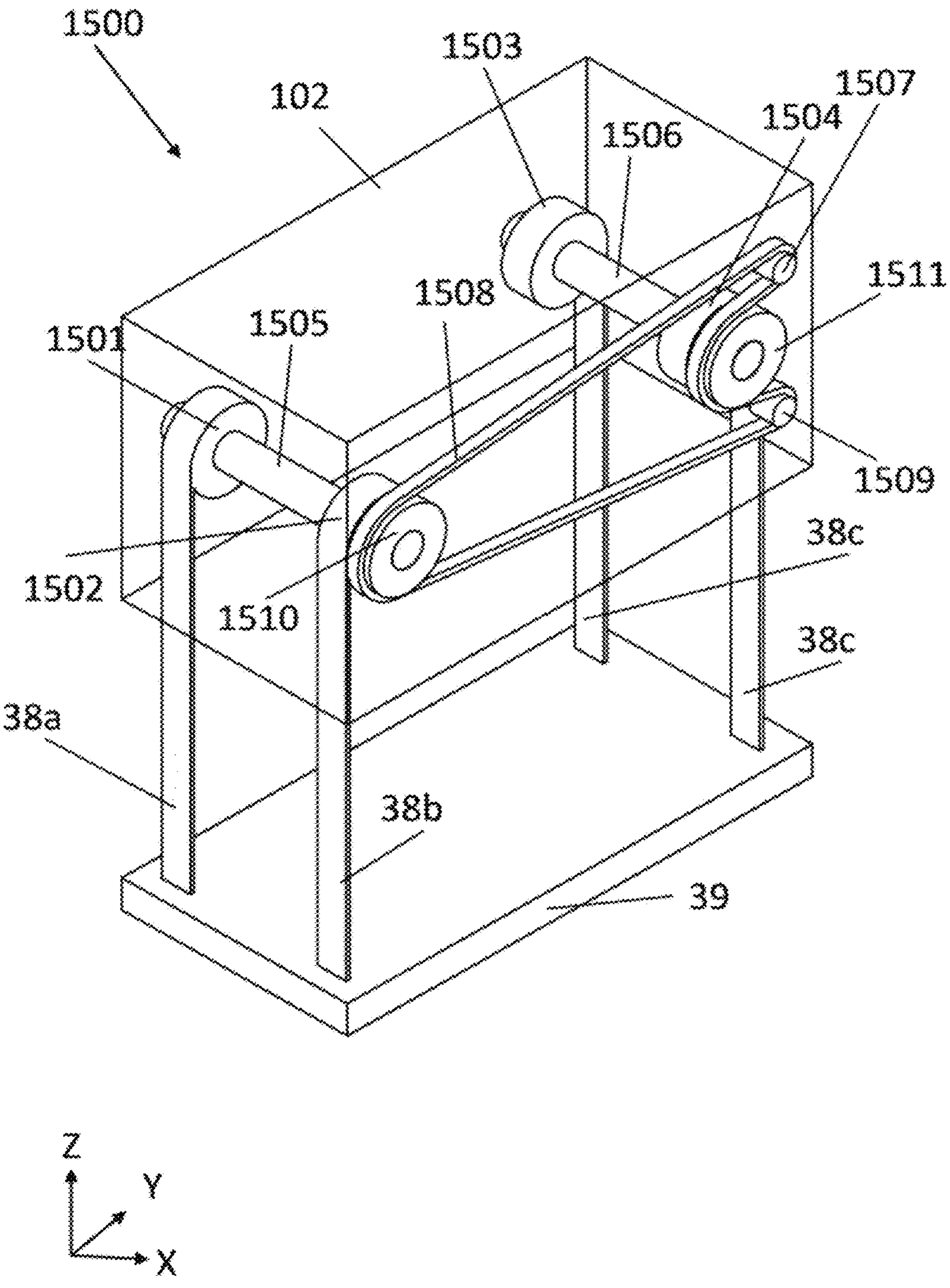
FIG. 15 shows an example container-lifting assembly.

An example container-lifting assembly (further described in PCT application no. PCT/EP2022/081364 (Ocado)) is shown in FIG. 15. In the embodiment of FIG. 15, a lifting assembly 1500 has four spools 1501, 1502, 1503, and 1504 to wind and unwind respective tethers 38. Spools 1501 and 1502 are on drive shaft 1505, whereas spools 1503 and 1504 are on drive shaft 1506. Drive shafts 1505 and 1506, when driven by a motor, are configured to rotate in opposite directions. By rotating drive shafts 1505 and 1506 in opposite directions, respective tethers 38*a-d* can be located at or near the corners of the lifting assembly, as with the embodiments above. In particular, as shown in FIG. 15, the point at which each tether winds or unwinds to or from a spool is at or near a respective corner of the lifting assembly. This allows the tethers to connect to the container gripper device 39 at a respective corner of the gripping assembly, which increases stability when raising and lowering the container gripper device 39. FIG. 15 shows one example of how drive shafts 1505 and 1506 can be rotated in opposite directions. Drive shafts 1505 and 1506 are connected to pulleys 1510 and 1511 respectively. Pulleys 1507 and 1509 are linked to the axles of respective motors (not shown in FIG. 15). The use of two motors increases the torque delivered to drive belt 1508. Drive belt 1508 transmits the torque to pulleys 1509, 1510, and 1511 in a way that ensures spools 1501 and 1502, and spools 1503 and 1504 rotate in opposite directions. In particular, pulleys 1507 and 1509 are arranged about pulley 1511 to effect its opposite rotation to pulley 1510.

It will now be appreciated that load-handling device 30 has three systems, each of which can use a drive belt and two motors: the direction-change assembly; the drive assembly; and the container-lifting assembly. The drive belt tension for each system should be optimized taking into account drive belt slip and efficiency. Whilst setting a high drive belt tension ensures no drive belt slip, this decreases the power efficiency of the various systems of the load-handling device. Reducing the drive belt tension increases the likelihood of slippage which means the systems of the load-handing device do not function in a timely and smooth way. Any slippage in the drive belt should be determined so that the drive belt tension can be adjusted accordingly. It should be appreciated that these problems are common to all systems in which drive belt slippage should be determined so that the drive belt tension can be adjusted accordingly. The above is merely illustrative of how an example belt drive belt can be used in a load-handling device. The ability to determine drive belt slippage in any system is desirable.

Figure 16:
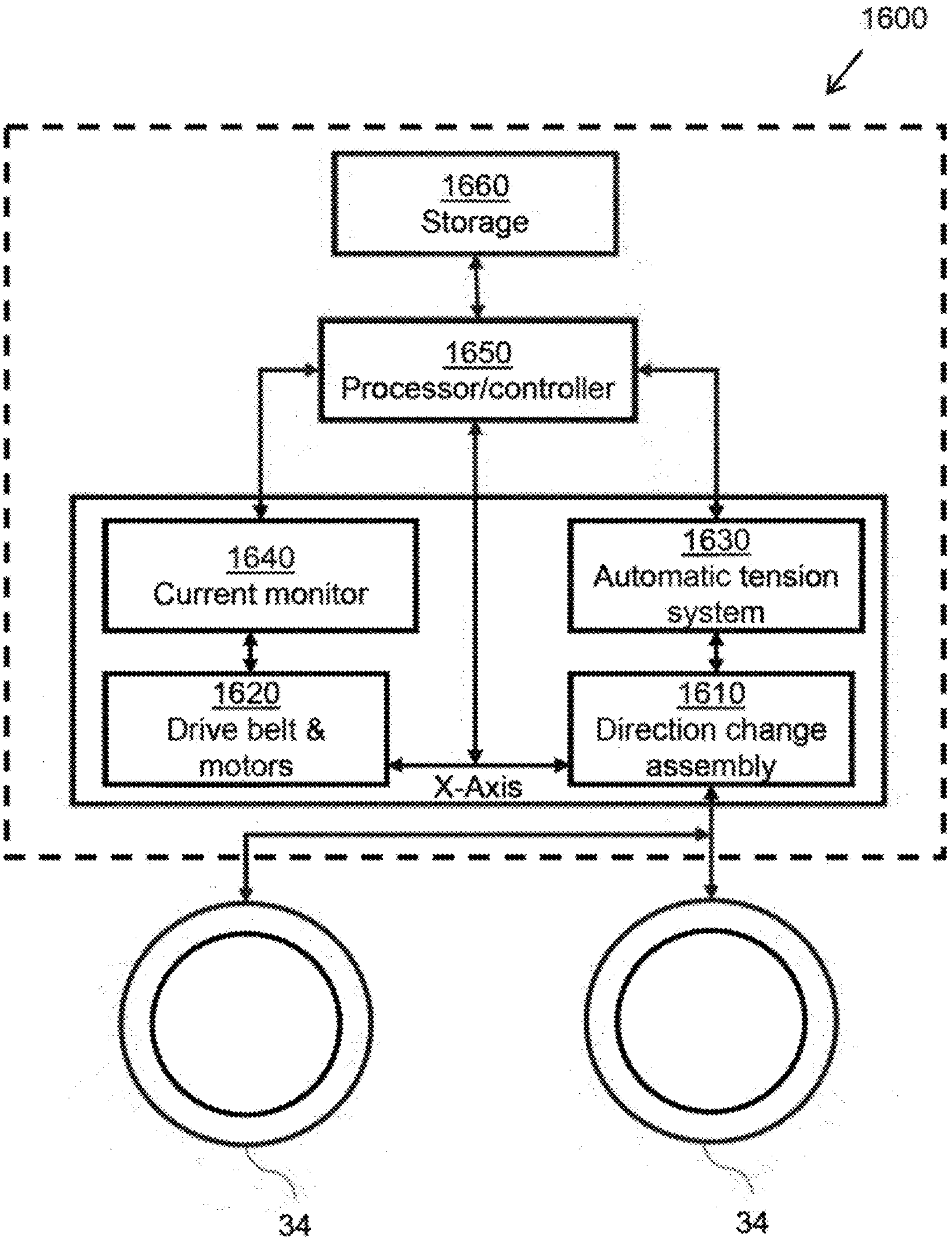
FIG. 16 shows a system according to an embodiment.

FIG. 16 shows a schematic 1600 of load-handling device 30 in accordance with the invention. A direction-change assembly 1610, such as that shown in FIG. 6, is driven by a drive belt, a first motor, and a second motor 1620. It will be appreciated that direction-change assembly 1610 could instead be the drive assembly (such as that shown in FIG. 14) or the container-lifting assembly (such as that shown in FIG. 16). In FIG. 16, only a pair of wheels 34 for moving the load-handling device 30 in the X-direction on the grid structure are shown. However, the complete set of wheels for each of the X- and Y-directions, e.g. the first set 34 and second set 36 of wheels described in earlier examples, can be included. One or more current monitors 1640 allows the currents drawn by the first and second motors to be monitored. That is the current draw of the first and second motors when activated, is monitored. A current monitor can be implemented by taking appropriate outputs from a motor driver circuit for example. In one implementation, a current monitor can be implemented on output lines from a motor driver component. The current monitor could work in various ways. One example is a current sensor resistor, where the motor current is passed through a resistor, and the voltage can then be measured across the resistor. From this voltage, the current can be calculated. Another example is a magnetic current sensor, using the Hall effect to determine the current flowing in the output lines from the motor driver. One or more automatic tension systems 1630 can be included. Load-handling device 30 can use processor or controller 1650 to receive and transmit data from and to each of the direction-change assembly 1610, one or more sets of first and second motors and drive belts, one or more automatic tension systems 1630, and one or more current monitors 1640. This data can be stored in storage 1660. The data in storage 1660 can be periodically transmitted for further processing via one or more networks, such as base stations.

Figure 17:
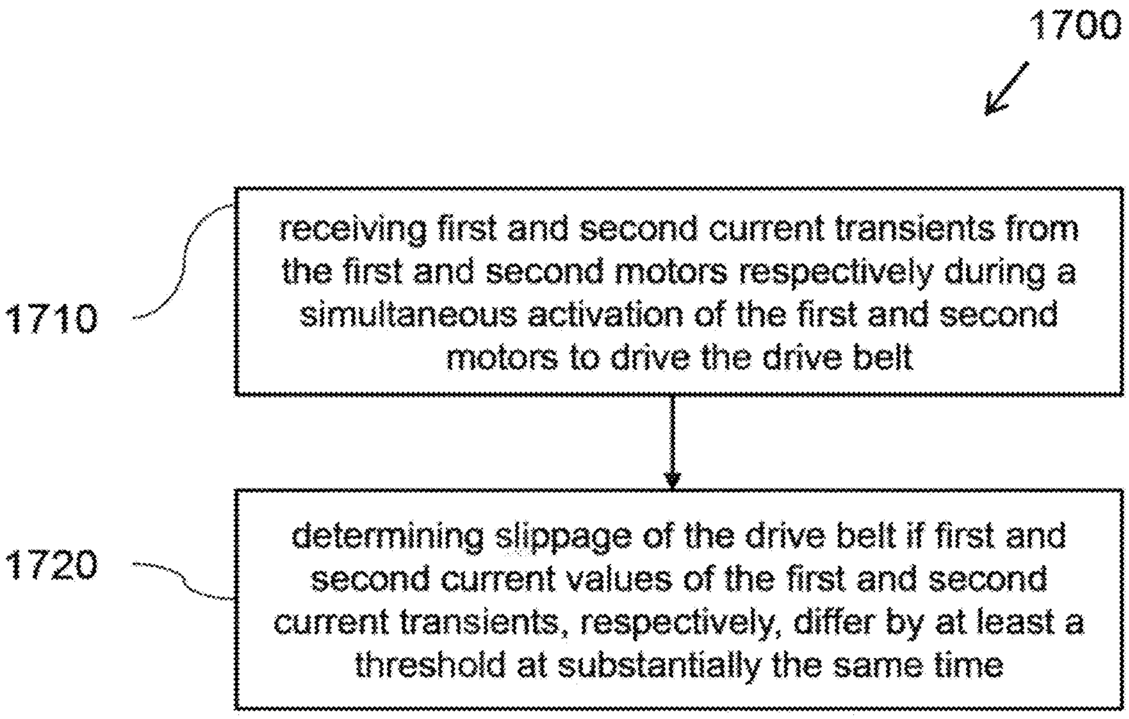
FIG. 17 shows a method for determining a drive belt slippage within a system, according to an embodiment.

FIG. 17 shows the steps of a method 1700 for determining slippage of a drive belt used in a system comprising a drive belt and first and second motors, wherein the first and second motors drive the drive belt. It would be appreciated that the method of FIG. 17 could be carried out using a controller of the system (the controller of a load-handling device of FIG. 16 for example). In step 1710, first and second current transients are received from the first and second motors respectively during a simultaneous activation of the first and second motors to drive the drive belt. In other words, the current draw of each motor during activation is received.

The simultaneous activation of the first and second motors could be for the purpose of activating the direction-change assembly to raise or lower the first set of wheels, and or lower or raise the second set of wheels with respect to the body or skeleton to engage and disengage the wheels with the parallel tracks. Alternatively, simultaneous activation of the first and second motors could be for the purpose of activating the drive assembly to drive the first or second sets of wheels to move the load-handling device along the first or second set of parallel rails respectively. Alternatively, simultaneous activation of the first and second motors could be for the purpose of activating the container-lifting assembly to raise or lower a container gripping device in a vertical direction. These examples are in the context of a load-handling device, but the method of FIG. 17 applies to any system in which simultaneous activation of first and second motors are used to drive a drive belt for any purpose, such as overcoming a load applied to the system.

In step 1720, it is determined that slippage of the drive belt has occurred if first and second current values of the first and second current transients, respectively, differ by at least a threshold, at substantially the same time. The threshold may be a predetermined Ampere, A, value difference between the first and second current values. The predetermined Ampere value may be an absolute value or a modulus. Alternatively, the threshold can require the first current value to differ from the second current value by a predetermined percentage of the first current value and vice versa. In other words, assuming the first current value is higher than the second current value, it is determined if the second current value is at least a predetermined percentage of the first current value lower than the first current value. Alternatively, it is determined if the first current value is at least a predetermined percentage of the second current value higher than the second current value. In effect the threshold allows the detection of a pattern in the first and second current transients, where at a given time, the first and second current values sharply deviate from one another. In particular, the rapid increase on one current transient at the same time as a rapid decrease in the other current transient is a pattern indicative of slippage of the drive belt.

To improve accuracy, the threshold may require both a predetermined Ampere value and a predetermined percentage to be met. A percentage threshold can be easily detected, but also requiring a minimum Ampere difference ensures that noise in the current transients is not interpreted as belt slippage. It will be appreciated that the threshold used will vary depending on the configuration of a system, but can nonetheless be set to determine drive belt slippage.

Figure 18:
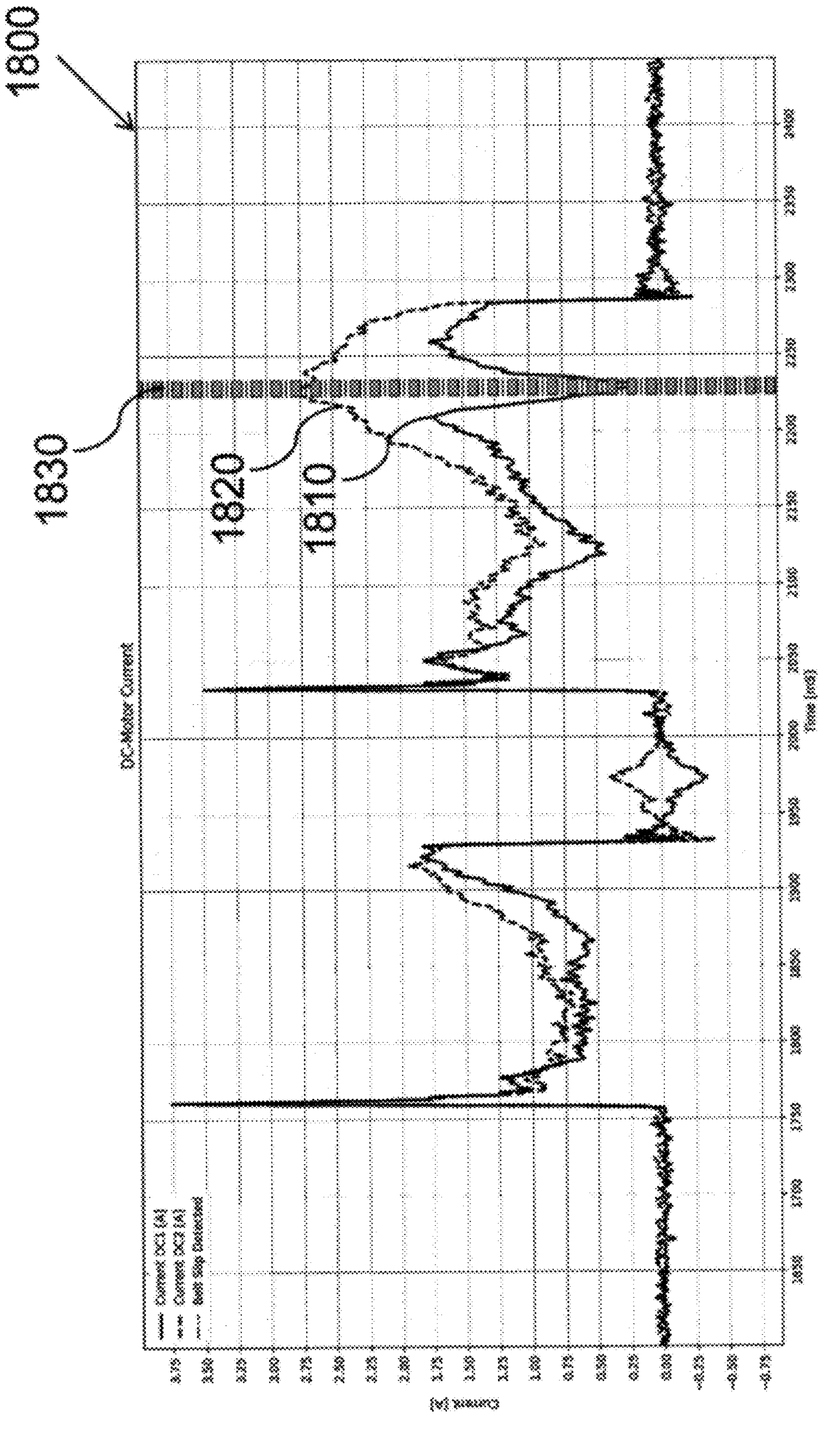
FIG. 18 shows first and second current transients according to an embodiment.
Figure 19:
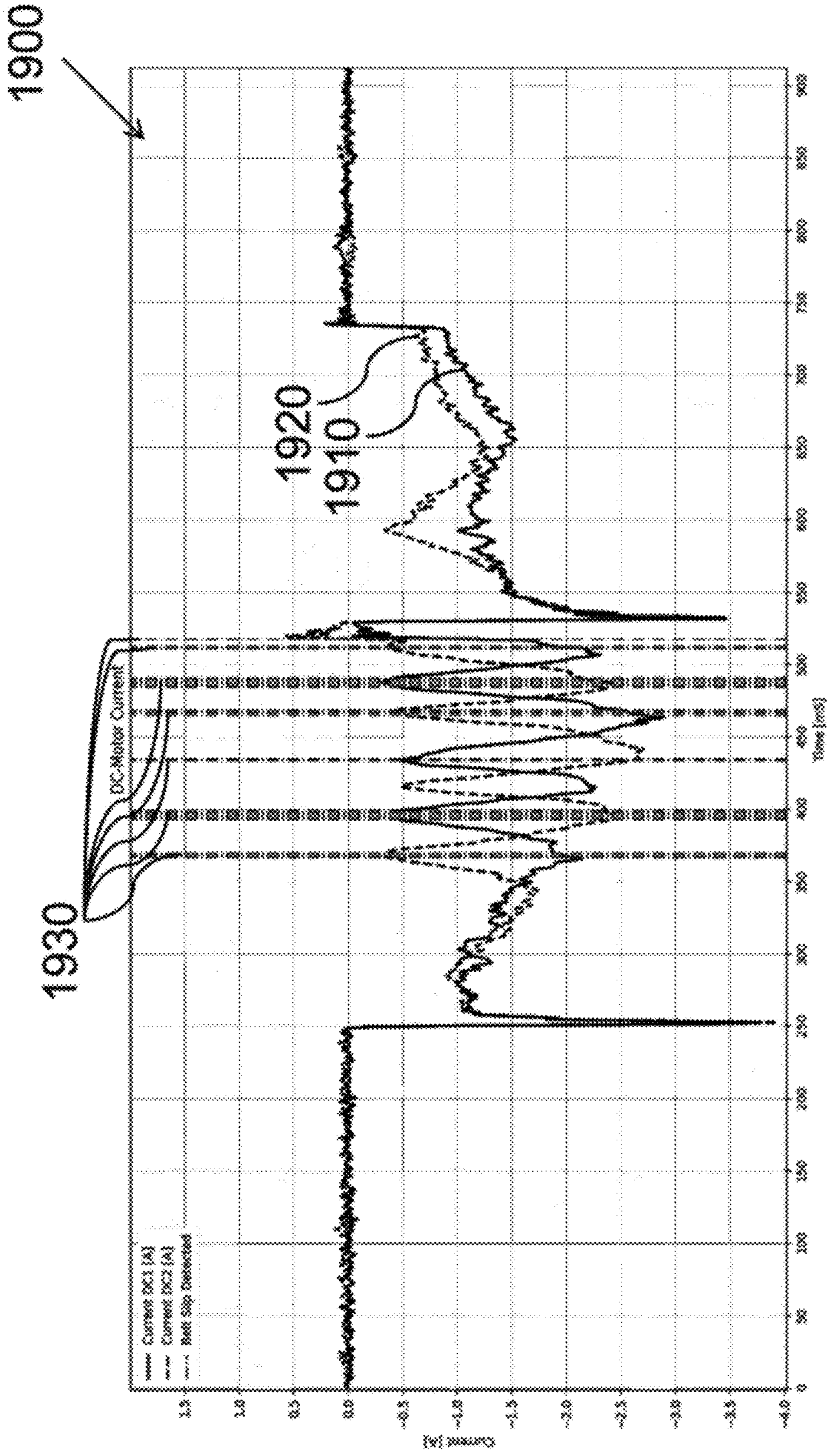
FIG. 19 shows first and second current transients according to an embodiment.

FIG. 18 shows a plot/graph 1800 with first 1810 and second 1820 current transients and a region 1830 in which belt slip has been detected. The threshold in this example requires that: (1) the first and second current values differ by at least 0.8 A; and (2) the second current value is lower than the first current value by at least 20% of the first current value. In effect, a pattern in the first and second current transients indicative of slippage of the belt drive, is detected. FIG. 19 shows a plot/graph 1900 with first 1910 and second 1920 current transients and multiple regions 1930 in which belt slip has been detected.

Advantageously, the method of FIG. 17 can be used to determine drive belt slippage using existing hardware of the system. No system downtime for observation is required.

The method of FIG. 17 finds use in a number of applications. One such application is to run the method as part of a system boot sequence. Once it has been determined that drive belt slippage has not occurred, the system can proceed to normal operation.

Another application is to correlate detected drive belt slippage to operation of the system. For example, if the slippage is detected at the same time within an operating cycle of the system, there may be some aspect of the system that is resulting in slippage. Although it may be possible to overcome this type of slippage by increasing the drive belt tension, doing so may mean that the system is not running at optimum efficiency. Therefore, this information can be used to refine the design of the system. Similarly, if there are multiple slippages detected within an operating cycle of the system, it can be concluded that the drive belt tension is significantly lower than an optimal drive belt tension.

Another application is, upon determining that drive belt slippage has occurred, to increase the tension of the drive belt. Additionally, or alternatively, upon determining that drive belt slippage has not occurred, the tension of the drive belt can be decreased. Decreasing the belt tension has the aim of improving efficiency to the extent possible without introducing belt slippage. The system could include an automatic tensioning system 1630, such as linking one of the tensioning wheel arrangements 1440 to a stepped motor that can move the tensioning wheel arrangement to increase/decrease drive belt tension to an optimal value. Another example of an automatic tensioning system is a linear actuator that moves a tensioning pulley on which the drive belt operates. Movement of the tensioning pulley via the linear actuator can increase the drive belt tension. In general, the automatic tensioning system moves a pulley or drive belt guide to increase the tension of the drive belt. As mentioned above, it can be deduced that the drive belt tension is significantly below an optimal tension. Once the automatic tensioning system has adjusted the tension, the method of FIG. 17 can be re-run to ensure that drive belt slippage is no longer occurring. Such information can be used by processor/controller to control the extent to which the automatic tensioning system increases the drive belt tension.

In this document, the language "movement in the n-direction" (and related wording), where n is one of x, y and z, is intended to mean movement substantially along or parallel to the n-axis, in either direction (i.e. towards the positive end of the n-axis or towards the negative end of the n-axis).

In this document, the word "connect" and its derivatives are intended to include the possibilities of direct and indirection connection. For example, "x is connected to y" is intended to include the possibility that x is directly connected to y, with no intervening components, and the possibility that x is indirectly connected to y, with one or more intervening components. Where a direct connection is intended, the words "directly connected", "direct connection" or similar will be used. Similarly, the word "support" and its derivatives are intended to include the possibilities of direct and indirect contact. For example, "x supports y" is intended to include the possibility that x directly supports and directly contacts y, with no intervening components, and the possibility that x indirectly supports y, with one or more intervening components contacting x and/or y. The word "mount" and its derivatives are intended to include the possibility of direct and indirect mounting. For example, "x is mounted on y" is intended to include the possibility that x is directly mounted on y, with no intervening components, and the possibility that x is indirectly mounted on y, with one or more intervening components.

In this document, the word "comprise" and its derivatives are intended to have an inclusive rather than an exclusive meaning. For example, "x comprises y" is intended to include the possibilities that x includes one and only one y, multiple y's, or one or more y's and one or more other elements. Where an exclusive meaning is intended, the language "x is composed of y" will be used, meaning that x includes only y and nothing else.

In this document, "controller" is intended to include any hardware which is suitable for controlling (e.g. providing instructions to) one or more other components. For example, a processor equipped with one or more memories and appropriate software to process data relating to a component or components and send appropriate instructions to the component(s) to enable the component(s) to perform its/their intended function(s).

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention can take the form of an entirely hardware embodiment, an entirely software embodiment or an embodiment containing both hardware and software elements. In a preferred embodiment, the invention is implemented in software.

Furthermore, the invention can take the form of a computer program embodied as a computer-readable medium having computer executable code for use by or in connection with a computer. For the purposes of this description, a computer readable medium can be any tangible apparatus that can contain, store, communicate, propagate, or transport the program for use by or in connection with the computer. Moreover, a computer-readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The flow diagrams in the figures illustrate the architecture, functionality, and operation of possible implementations of methods according to various embodiments of the present invention. In this regard, each block in the flow diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the flow diagrams, and combinations of blocks in the flow diagrams, can be implemented by special purpose hardware-based systems that perform the specified functions or acts, or combinations of special purpose hardware and computer instructions.

It will be understood that the above description of is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

The following is a non-exhaustive list of embodiments which may be or are claimed:

Embodiment 1: A system for determining slippage of a drive belt, the system comprising: a drive belt; first and second motors configured to drive the drive belt; and a controller configured to: receive first and second current transients from the first and second motors respectively during a simultaneous activation of the first and second motors to drive the drive belt; and determine slippage of the drive belt if first and second current values of the first and second current transients, respectively, differ by at least a threshold at substantially the same time.

Embodiment 2: The system of embodiment 1, wherein the threshold is defined by: a minimum percentage difference between the first and second current values; and/or a minimum ampere difference between the first and second current values.

Embodiment 3: A load-handling device for lifting and moving storage containers (10) stacked in a grid framework structure comprising: a first set of parallel rails or tracks and a second set of parallel rails or tracks extending substantially perpendicularly to the first set of rails or tracks in a substantially horizontal plane to form a grid pattern comprising a plurality of grid spaces, wherein the grid is supported by a set of uprights to form a plurality of vertical storage locations beneath the grid for containers to be stacked between and be guided by the uprights in a vertical direction through the plurality of grid spaces, the load-handling device comprising: a body or skeleton mounted on a first set of wheels being arranged to engage with the first set of parallel tracks and a second set of wheels being arranged to engage with the second set of parallel tracks; and a drive assembly comprising a first system according to embodiment 1 or 2, wherein the drive belt and first and second motors of the first system are configured to drive the first or second sets of wheels to move the load-handling device along the first or second set of parallel rails respectively, and wherein the controller of the first system is configured to receive the first and second current transients from the first and second motors of the first system respectively during a driving of the first or second sets of wheels; and/or a direction-change assembly comprising a second system according to embodiment 1 or 2, wherein the drive belt and first and second motors of the second system are configured to raise or lower the first set of wheels, and or lower or raise the second set of wheels with respect to the body or skeleton to engage and disengage the wheels with the parallel tracks, and wherein the controller of the second system is configured to receive the first and second current transients from the first and second motors of the second system respectively during a raising or lowering of the first set of wheels, and or a lowering or raising of the second set of wheels; and/or a container-lifting assembly comprising a third system according to embodiment 1 or 2, wherein the drive belt and first and second motors of the third system are configured to raise or lower a gripping device in the vertical direction, and wherein the controller of the third system is configured to receive the first and second current transients from the first and second motors of the third system respectively during a raising or lowering of the gripping device.

Embodiment 4: The load-handling device of embodiment 3, wherein the direction-change assembly is arranged to raise or lower the first set of wheels and synchronously respectively lower or raise the second set of wheels with respect to the body.

Embodiment 5: The load-handling device according to embodiments 3 or 4, wherein the direction-change assembly comprises at least one direction-change mechanism for either of the first or second sets of wheels; or each of the first and second sets of wheels.

Embodiment 6: The load-handling device of embodiments 3 to 5, wherein the direction-change assembly comprises two direction-change mechanisms for each of the first and second set of wheels.

Embodiment 7: The load-handling device of embodiments 5 or 6, wherein the or each direction-change mechanism is driven by the drive belt.

Embodiment 8: The load-handling device of embodiments 3 to 6, wherein the two motors are mounted in opposite or adjacent locations of the load-handling device.

Embodiment 9: The load-handling device of embodiment 8, wherein the opposite or adjacent locations comprise corners of the load-handling device.

Embodiment 10: The load-handling device of embodiment 8, wherein the opposite or adjacent locations or corners are on the body or skeleton.

Embodiment 11: The load-handling device of embodiments 3 to 10, wherein the drive belt substantially circumnavigates the load-handling device skeleton or body.

Embodiment 12: The system of any preceding embodiment, wherein the system further comprises an automatic tensioning device, and the controller is further configured to control the automatic tensioning device to increase the tension of the drive belt upon determining slippage of the drive belt has occurred, and/or reduce the tension of the drive belt upon determining slippage of the drive belt has not occurred.

Embodiment 13: A method for determining slippage of a drive belt in a system comprising a drive belt, first and second motors configured to drive the drive belt, and a controller, the method comprising using the controller to: receive first and second current transients from the first and second motors respectively during a simultaneous activation of the first and second motors to drive the drive belt; and determine slippage of the drive belt if first and second current values of the first and second current transients, respectively, differ by at least a threshold at substantially the same time.

Embodiment 14: The method of embodiment 13, wherein the threshold is defined by: a minimum percentage difference between the first and second current values; and/or a minimum ampere difference between the first and second current values.

Embodiment 15: A method of operating a load-handling device for lifting and moving storage containers stacked in a grid framework structure comprising: a first set of parallel rails or tracks and a second set of parallel rails or tracks extending substantially perpendicularly to the first set of rails or tracks in a substantially horizontal plane to form a grid pattern comprising a plurality of grid spaces, wherein the grid is supported by a set of uprights to form a plurality of vertical storage locations beneath the grid for containers to be stacked between and be guided by the uprights in a vertical direction through the plurality of grid spaces, the load-handling device comprising: a body or skeleton mounted on a first set of wheels being arranged to engage with the first set of parallel tracks and a second set of wheels being arranged to engage with the second set of parallel tracks; and a drive assembly comprising a first drive belt, a first motor, and a second motor configured to drive the first or second sets of wheels to move the load-handling device along the first or second set of parallel rails respectively, and wherein a first method according to embodiments 13 or 14 is used to receive the first and second current transients from the first and second motors respectively during a driving of the first or second sets of wheels; and/or a direction-change assembly comprising a second drive belt, a third motor, and a fourth motor configured to raise or lower the first set of wheels, and or lower or raise the second set of wheels with respect to the body or skeleton to engage and disengage the wheels with the parallel tracks, and wherein a second method according to embodiments 13 or 14 is used to receive the first and second current transients from the third and fourth motors respectively during a raising or lowering of the first set of wheels, and or a lowering or raising of the second set of wheels; and/or a container-lifting assembly comprising a third drive belt, a fifth motor, and a sixth motor configured to raise or lower a gripping device in the vertical direction, and wherein a third method according to embodiments 13 or 14 is used to receive the first and second current transients from the fifth and sixth motors respectively during a raising or lowering of the gripping device.

Embodiment 16: The method of embodiment 15, wherein the direction-change assembly is arranged to raise or lower the first set of wheels and synchronously respectively lower or raise the second set of wheels with respect to the body.

Embodiment 17: The method of embodiments 15 or 16, wherein the direction-change assembly comprises at least one direction-change mechanism for: either of the first or second sets of wheels; or each of the first and second sets of wheels.

Embodiment 18: The method of embodiments 15 to 17, wherein the direction-change assembly comprises two direction-change mechanisms for each of the first and second set of wheels.

Embodiment 19: The method of embodiments 17 or 18, wherein the or each direction-change mechanism is driven by the second drive belt.

Embodiment 20: The method of embodiments 15 to 19, wherein the third and fourth motors are mounted in opposite or adjacent locations of the load-handling device.

Embodiment 21: The method of embodiment 20, wherein the opposite or adjacent locations comprise corners of the load-handling device.

Embodiment 22: The method of embodiment 20, wherein the opposite or adjacent locations or corners are on the body or skeleton.

Embodiment 23: The method of embodiments 15 to 22, wherein the second drive belt substantially circumnavigates the load-handling device skeleton or body.

Embodiment 24: The method of embodiments 15 to 23, wherein the system further comprises a an automatic tensioning device, and the method further comprises using the controller to control the automatic tensioning device to increase the tension of the drive belt upon determining slippage of the drive belt has occurred, and/or reduce the tension of the drive belt upon determining slippage of the drive belt has not occurred.

Embodiment 25: A computer program comprising instructions which, when the program is executed by a computer, cause the computer to carry out the method of embodiments 15 to 24.

Embodiment 26: A data processing system comprising a processor configured to carry out the method of embodiments 15 to 24.

What is claimed is:

1. A load-handling device for lifting and moving storage containers stacked in a grid framework structure including:

a first set of parallel rails or tracks and a second set of parallel rails or tracks extending substantially perpendicularly to the first set of rails or tracks in a substantially horizontal plane to form a grid pattern comprising a plurality of grid spaces, wherein the grid framework structure is supported by a set of uprights to form a plurality of vertical storage locations beneath the grid framework structure for containers to be stacked between and be guided by the uprights in a vertical direction through the plurality of grid spaces, the load-handling device comprising:

a body or skeleton mounted on a first set of wheels arranged to engage with the first set of parallel tracks and a second set of wheels arranged to engage with the second set of parallel tracks;

a first drive assembly including a first drive belt, first and second motors of the first drive assembly, and a controller, wherein the first drive belt and first and second motors of the first drive assembly are configured to drive the first or second sets of wheels to move the load-handling device along the first or second set of parallel tracks, respectively;

a direction-change assembly including a second drive assembly including a second drive belt, first and second motors of the direction-change assembly, and a controller, wherein the second drive belt and first and second motors of the direction-change assembly are configured to raise or lower the first set of wheels, and/or lower or raise the second set of wheels with respect to the body or skeleton to engage and disengage the wheels with the parallel tracks; and a container-lifting assembly including a third drive assembly including a third drive belt, first and second motors of the container-lifting assembly, and a controller, wherein the third drive belt and first and second motors of the container-lifting assembly are configured to raise or lower a gripping device in a vertical direction;

wherein the controller of at least one of the first drive assembly, the direction-change assembly, or the container-lifting assembly is configured to:

receive first and second current transients from the first and second motors of the at least one assembly, respectively, during a simultaneous activation of the first and second motors of the at least one assembly to drive the drive belt of the at least one assembly; and determine slippage of the drive belt of the at least one assembly if first and second current values of the first and second current transients, respectively, differ by at least a threshold at substantially a same time.

2. The load-handling device of claim 1, wherein the direction-change assembly is arranged to raise or lower the first set of wheels and synchronously respectively lower or raise the second set of wheels with respect to the body.

3. The load-handling device of claim 1, wherein the direction-change assembly comprises at least one direction-change mechanism for either of the first or second sets of wheels.

4. The load-handling device of claim 3, wherein the at least one direction-change mechanism is driven by the second drive belt of the direction-change assembly.

5. The load-handling device of claim 3, wherein:

the direction-change assembly comprises a plurality of direction-change mechanisms for each of the first and second sets of wheels, and each of the plurality of direction-change mechanisms is driven by the second drive belt of the direction-change assembly.

6. The load-handling device of claim 1, wherein the direction-change assembly comprises at least one direction-change mechanism for each of the first and second sets of wheels.

7. The load-handling device of claim 1, wherein the direction-change assembly comprises two direction-change mechanisms for each of the first and second set of wheels.

8. The load-handling device of claim 1, wherein the first and second motors of at least one of the first drive assembly, the direction-change assembly, or the container-lifting assembly are mounted in opposite or adjacent locations of the load-handling device.

9. The load-handling device of claim 8, wherein the opposite or adjacent locations comprise corners of the load-handling device.

10. The load-handling device of claim 9, wherein the opposite or adjacent locations comprising corners of the load-handling device are on the body or skeleton of the load-handling device.

11. The load-handling device of claim 1, wherein the second drive belt substantially circumnavigates the body or skeleton of the load-handling device.

12. The load-handling device of claim 1, wherein at least one of the first drive assembly, the direction-change assembly, or the container-lifting assembly further comprises an automatic tensioning device, and the controller of the at least one assembly is further configured to control the automatic tensioning device to increase a tension of the drive belt of the at least one assembly upon determining slippage has occurred, and/or reduce the tension of the drive belt of the at least one assembly upon determining slippage has not occurred.

* * * * *